Figure 26:
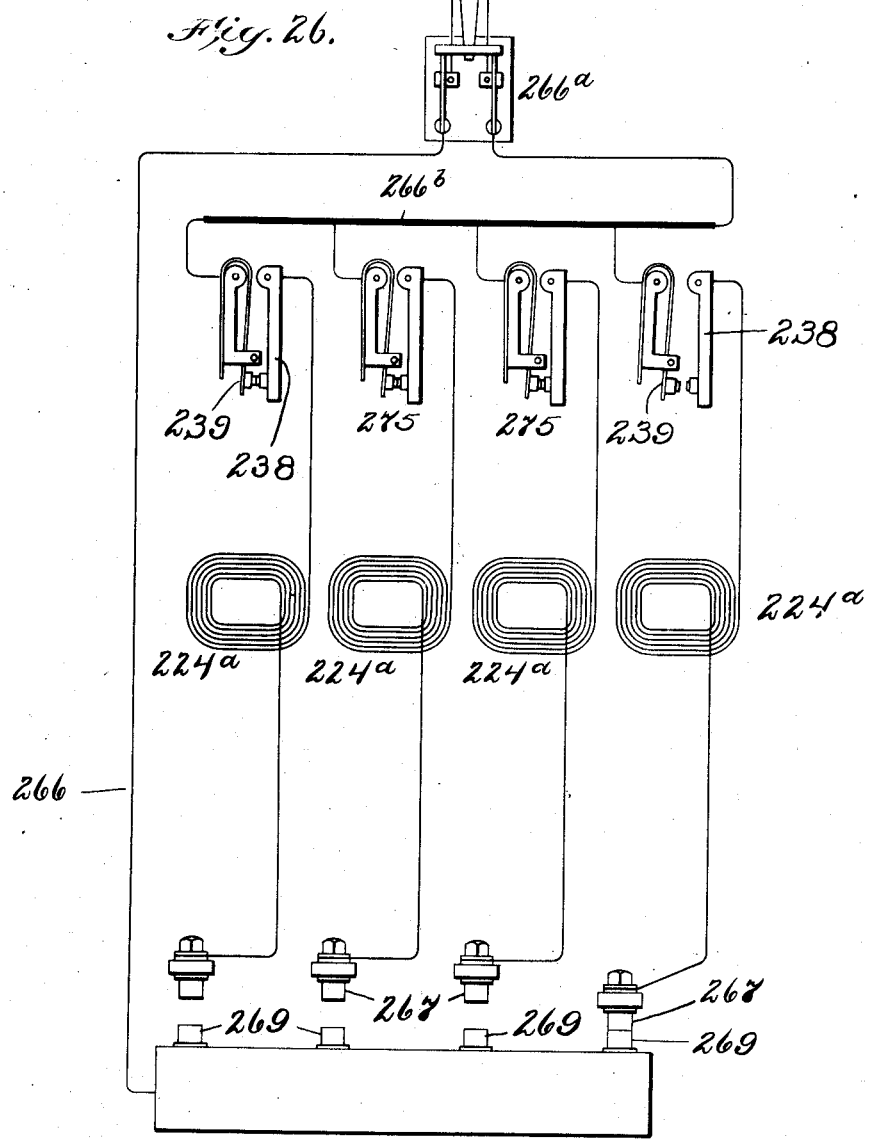

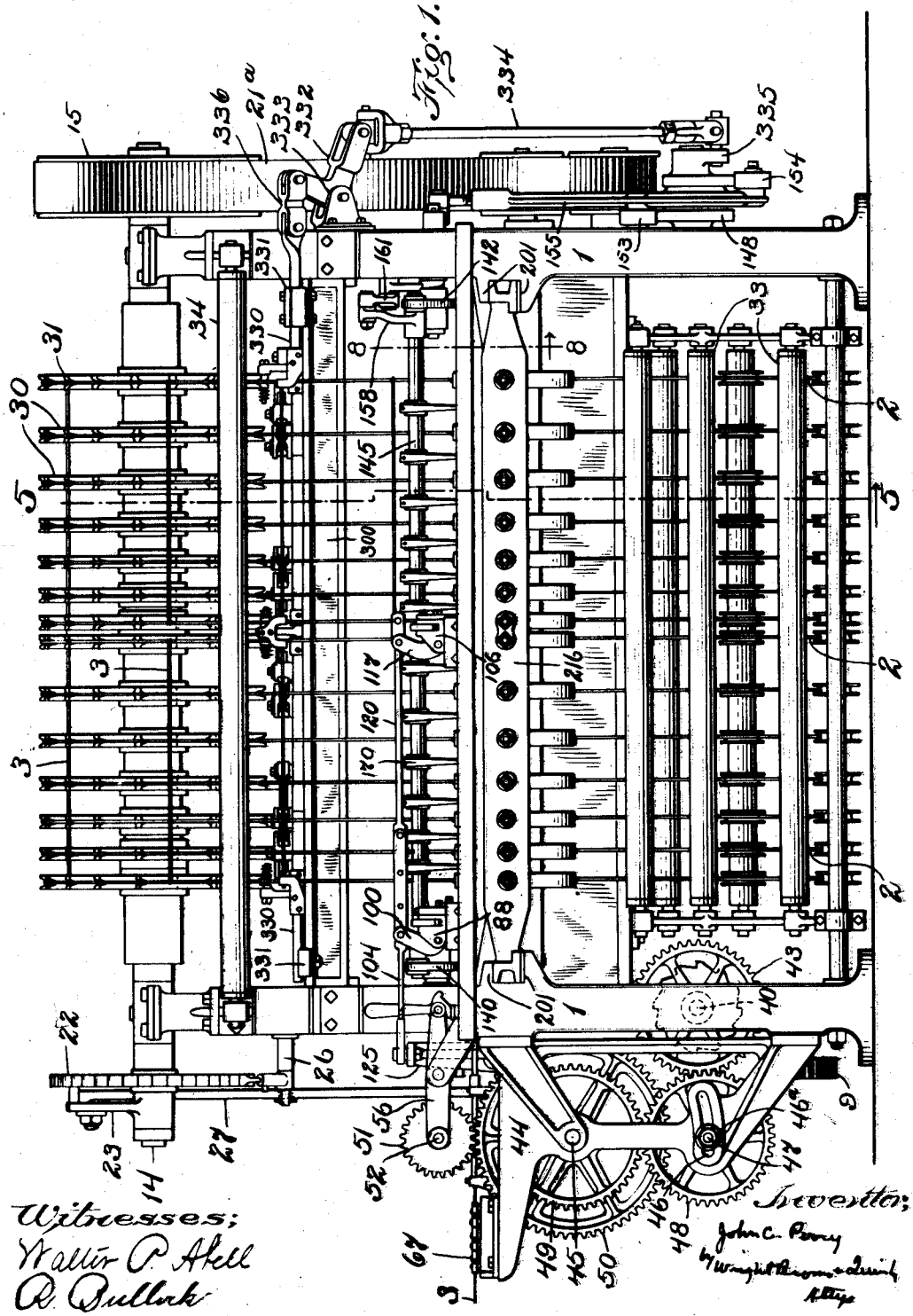

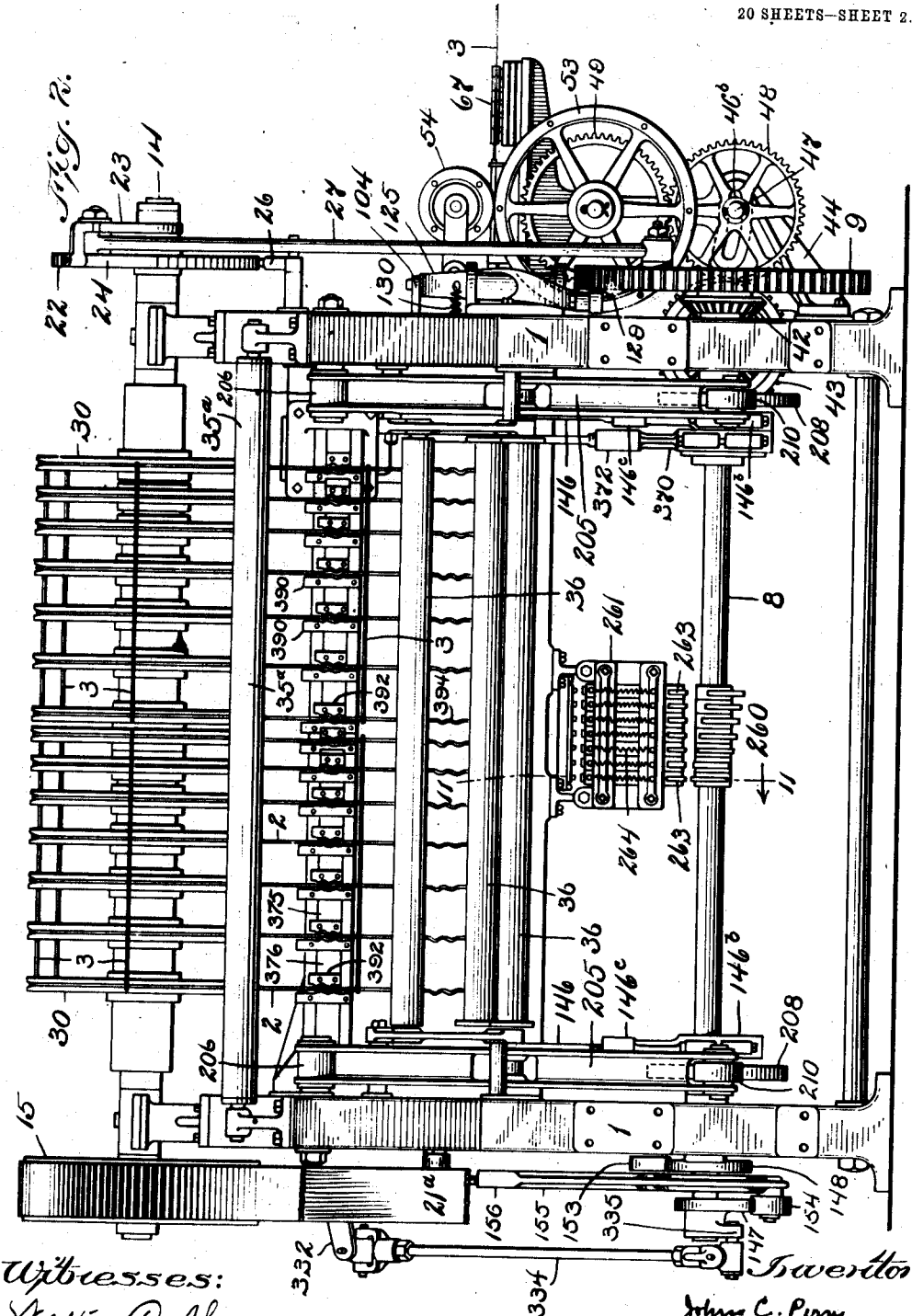

No. 813,823. PATENTED FEB. 27, 1906.
J. C. PERRY.
MACHINE FOR MAKING WIRE GOODS.
APPLICATION FILED APR. 25, 1903.
20 SHEETS—SHEET 3.
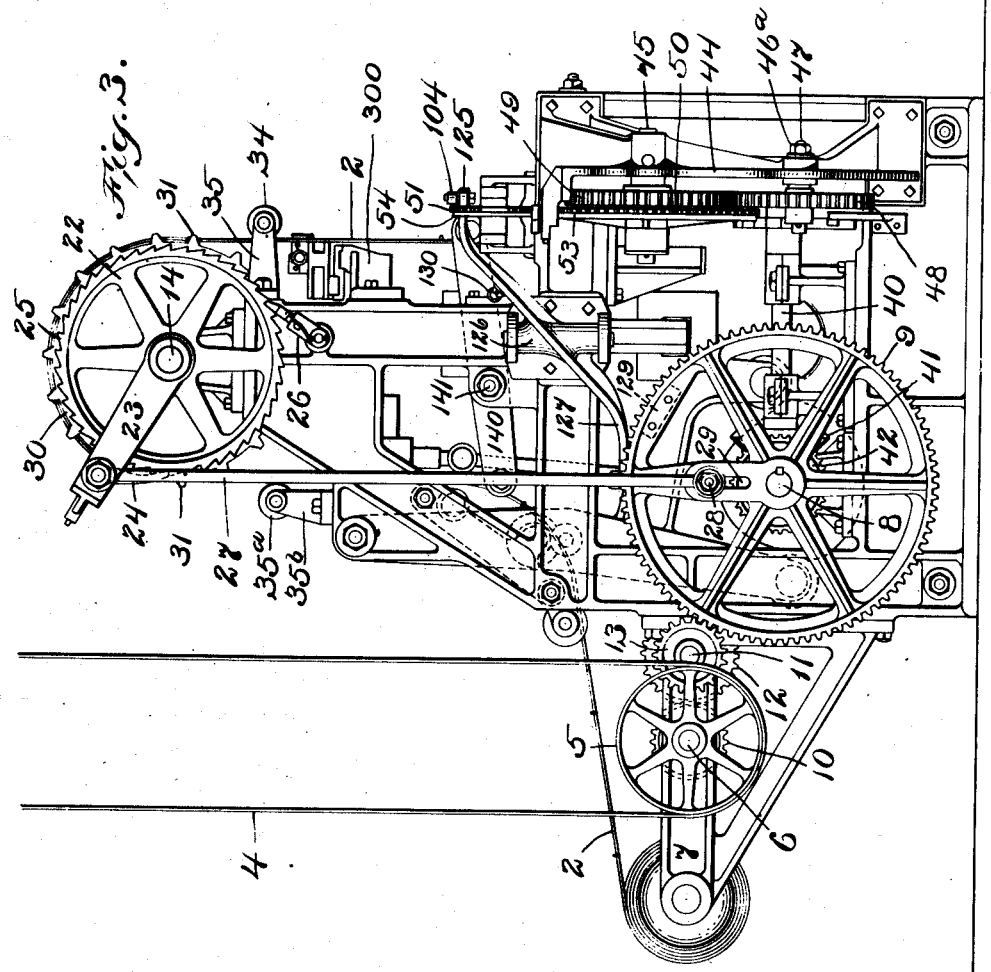

No. 813,823. PATENTED FEB. 27, 1906.
J. C. PERRY.
MACHINE FOR MAKING WIRE GOODS.
APPLICATION FILED APR. 25, 1903.
20 SHEETS—SHEET 4.
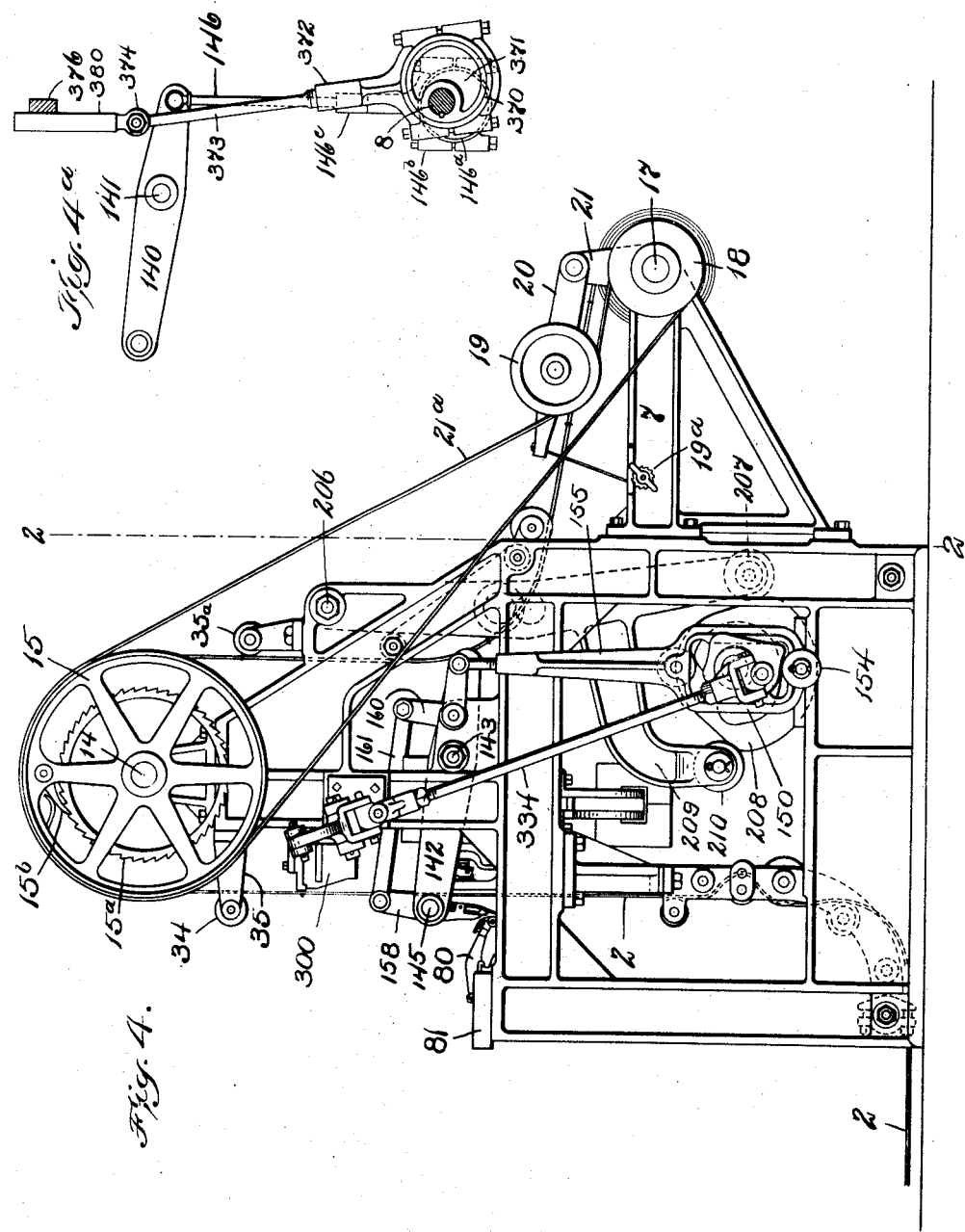
Witnesses:
Walter P. Abell.
R. Bullock
Inventor:
John C. Perry
by Wright Brown & Quinby
Attys No. 813,823. PATENTED FEB. 27, 1906.
J. C. PERRY.
MACHINE FOR MAKING WIRE GOODS.
APPLICATION FILED APR. 25, 1903.
20 SHEETS—SHEET 5.
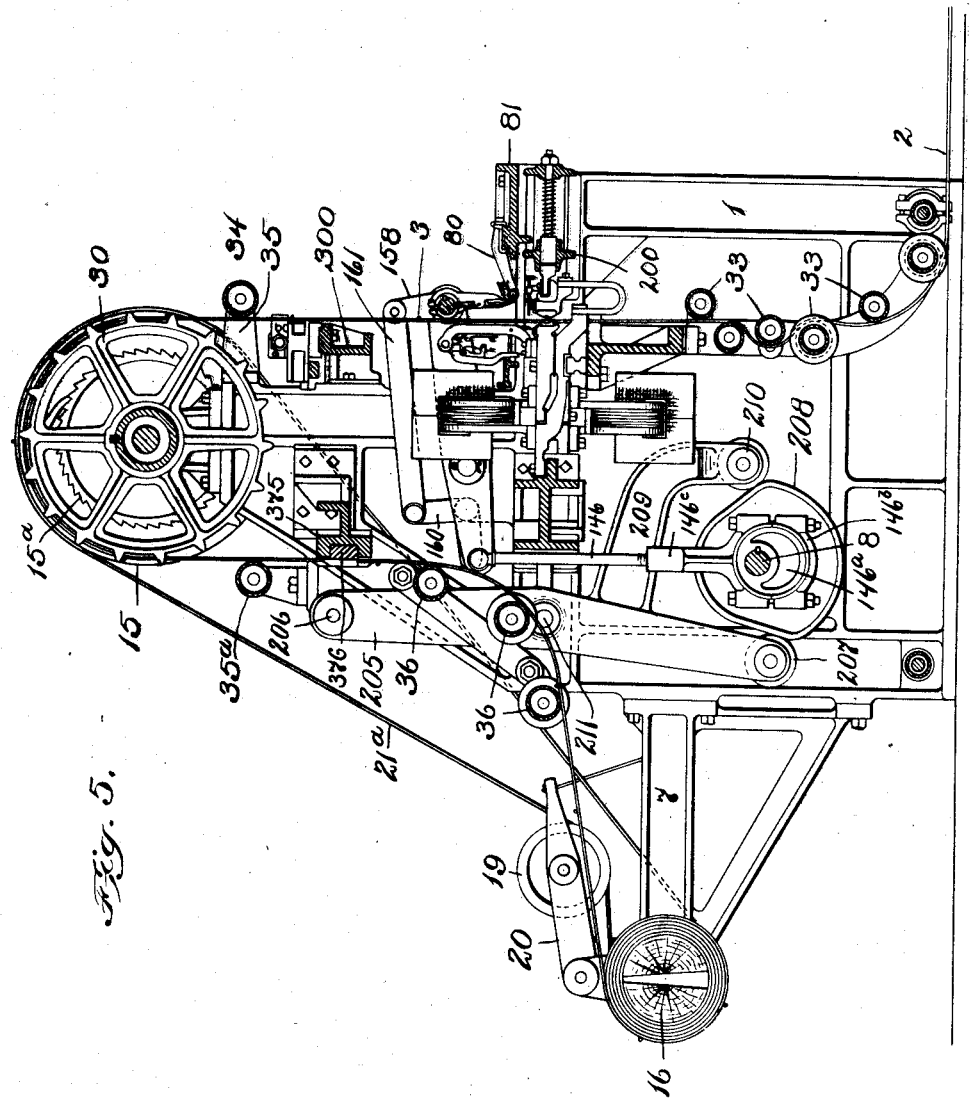

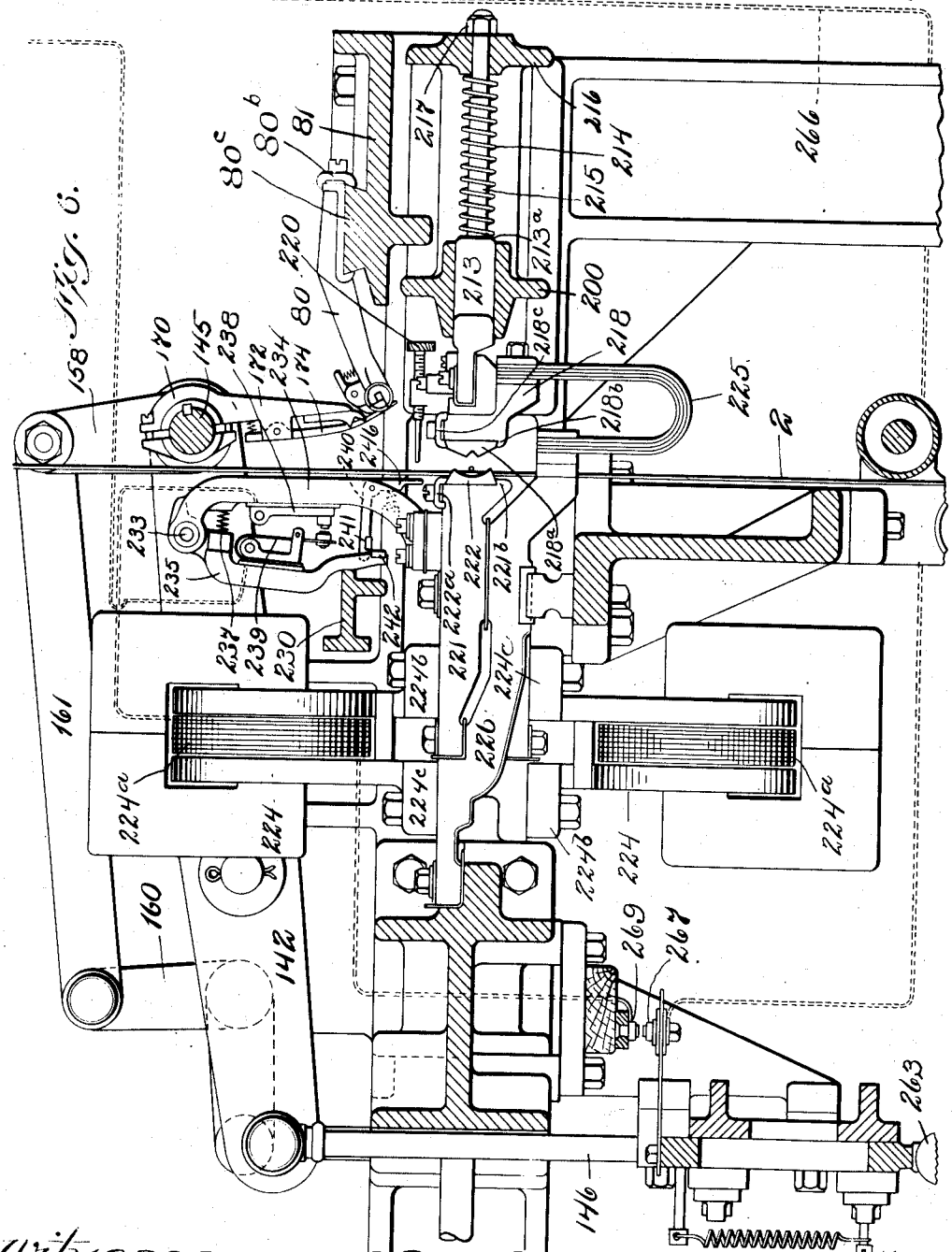

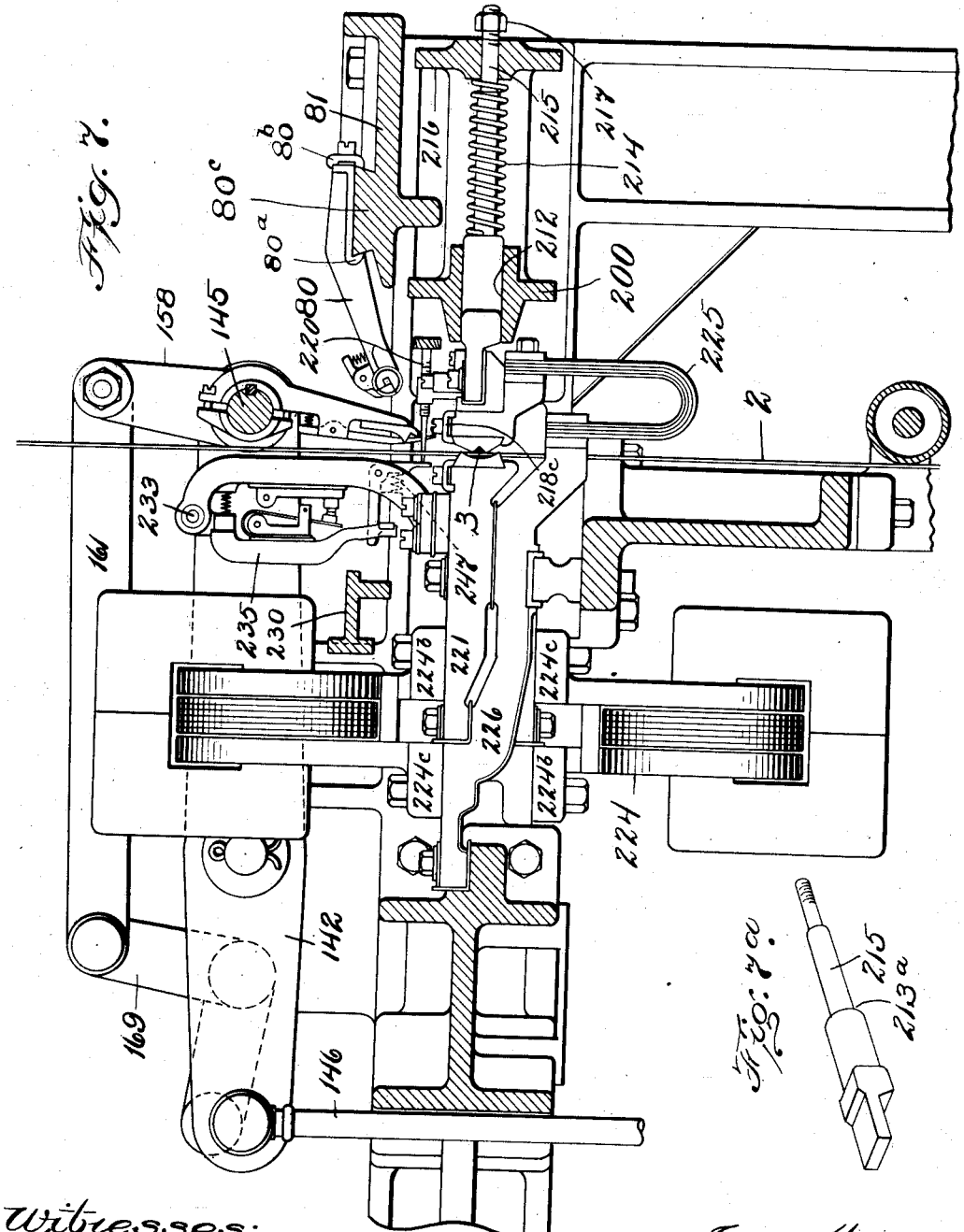

No. 813,823. PATENTED FEB. 27, 1906.
J. C. PERRY.
MACHINE FOR MAKING WIRE GOODS.
APPLICATION FILED APR. 25, 1903.
20 SHEETS—SHEET 8.
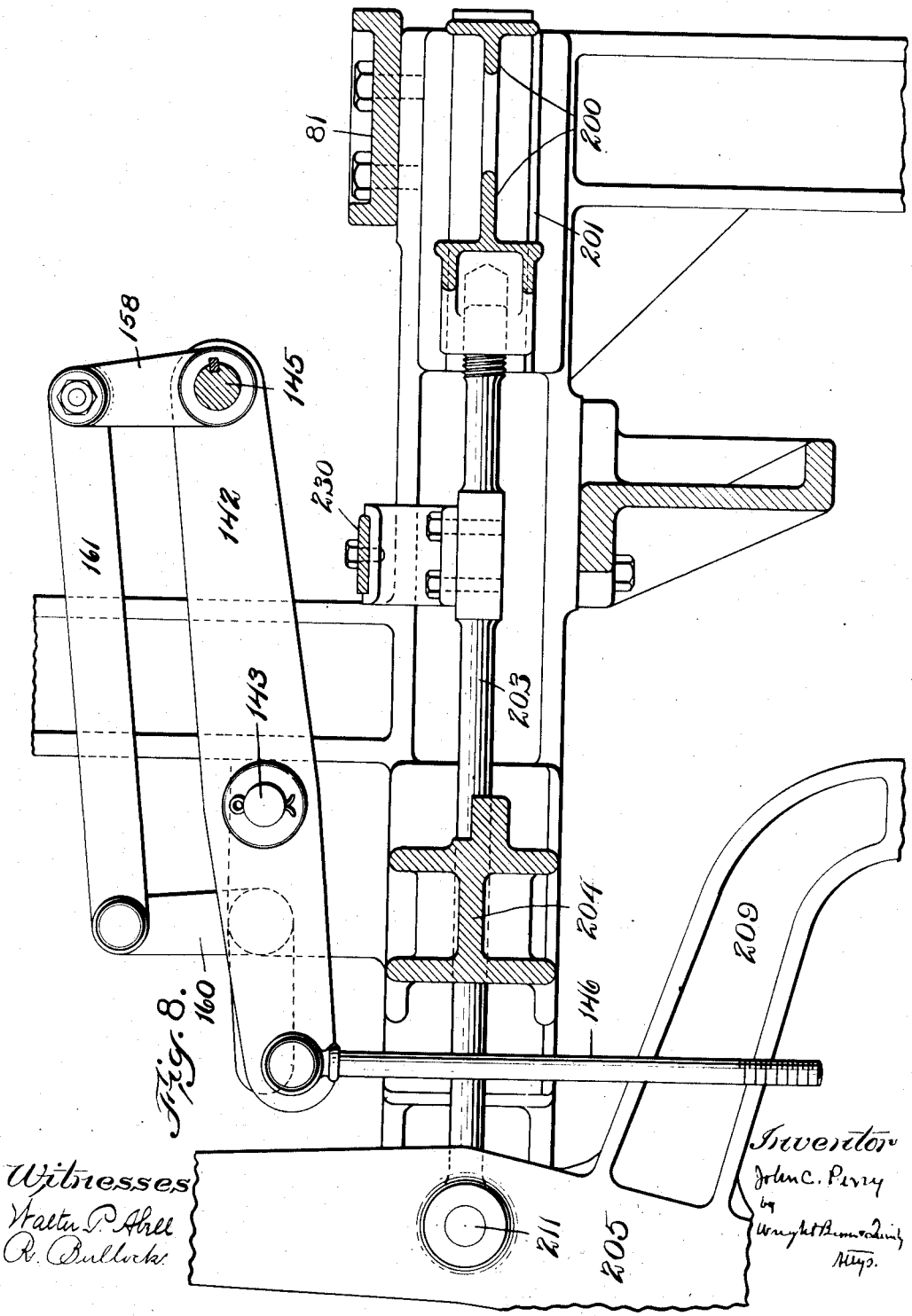

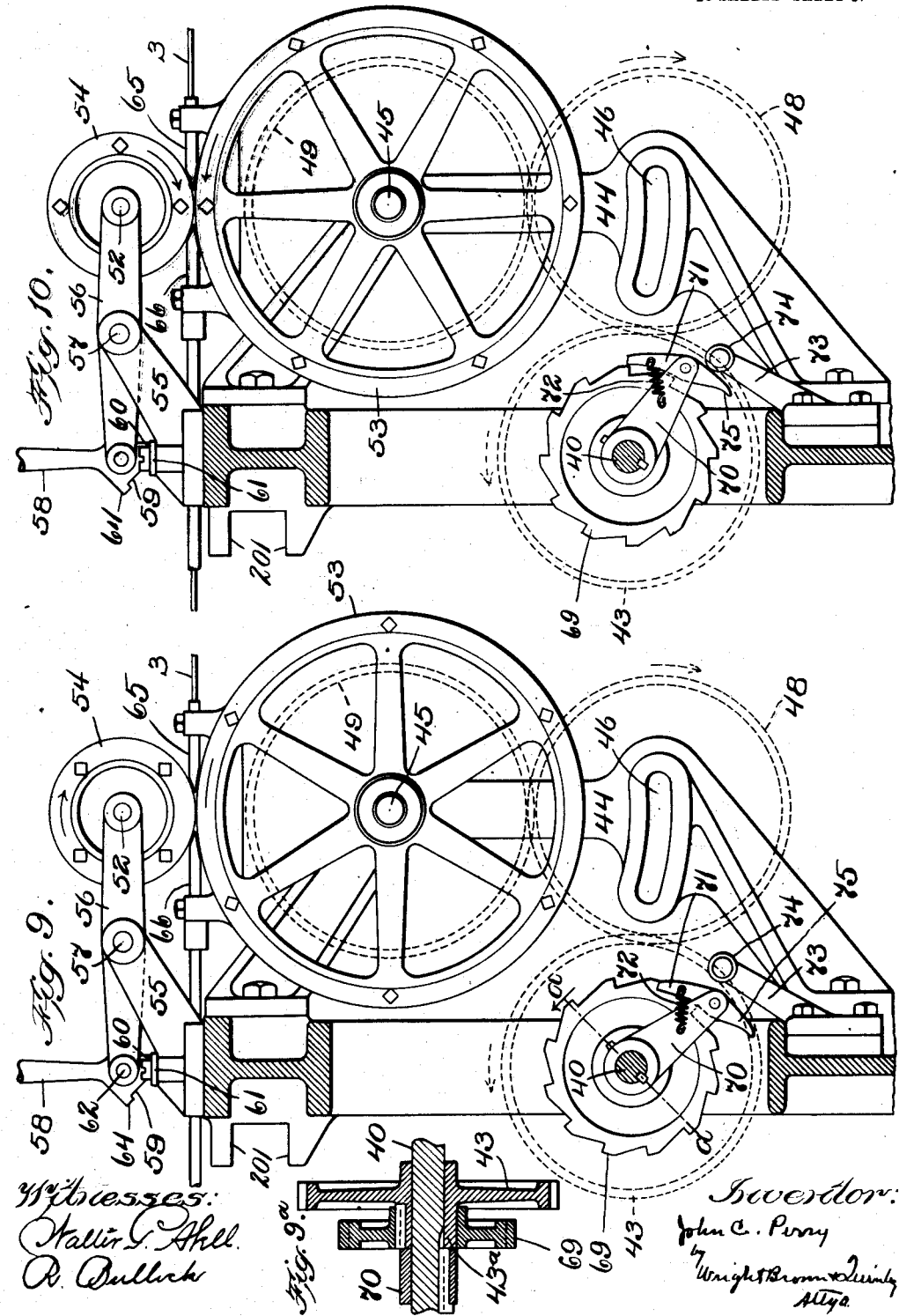

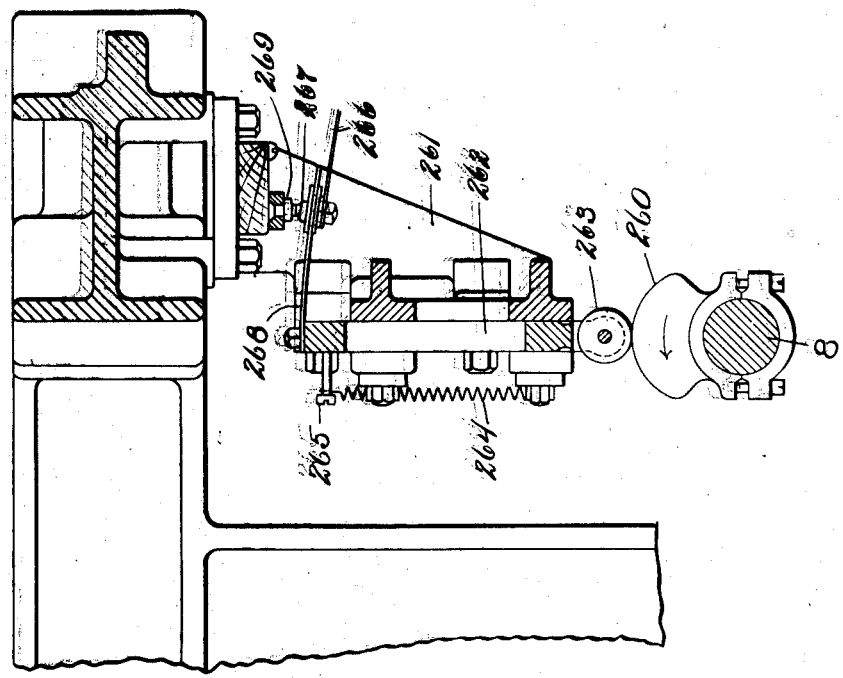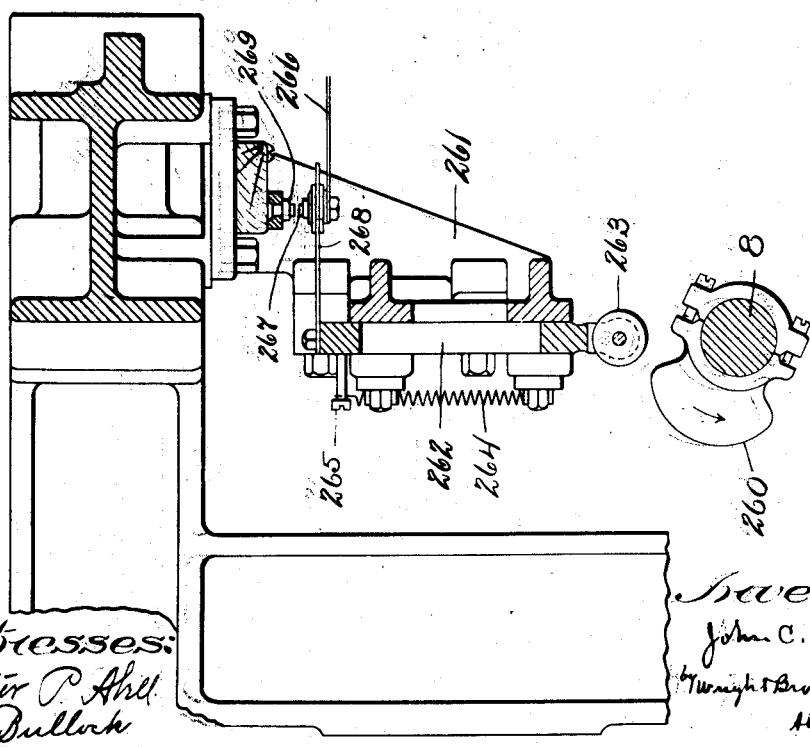

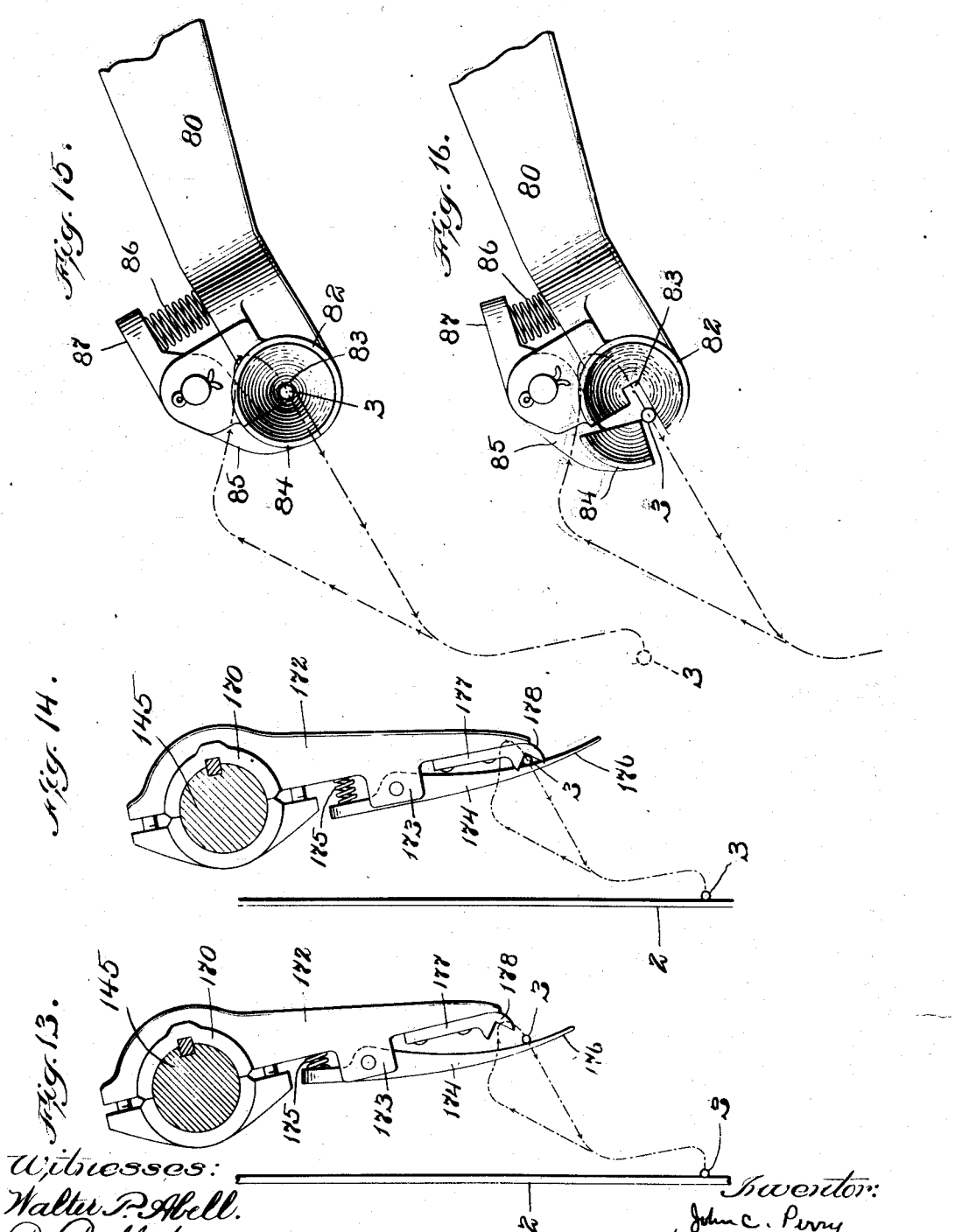

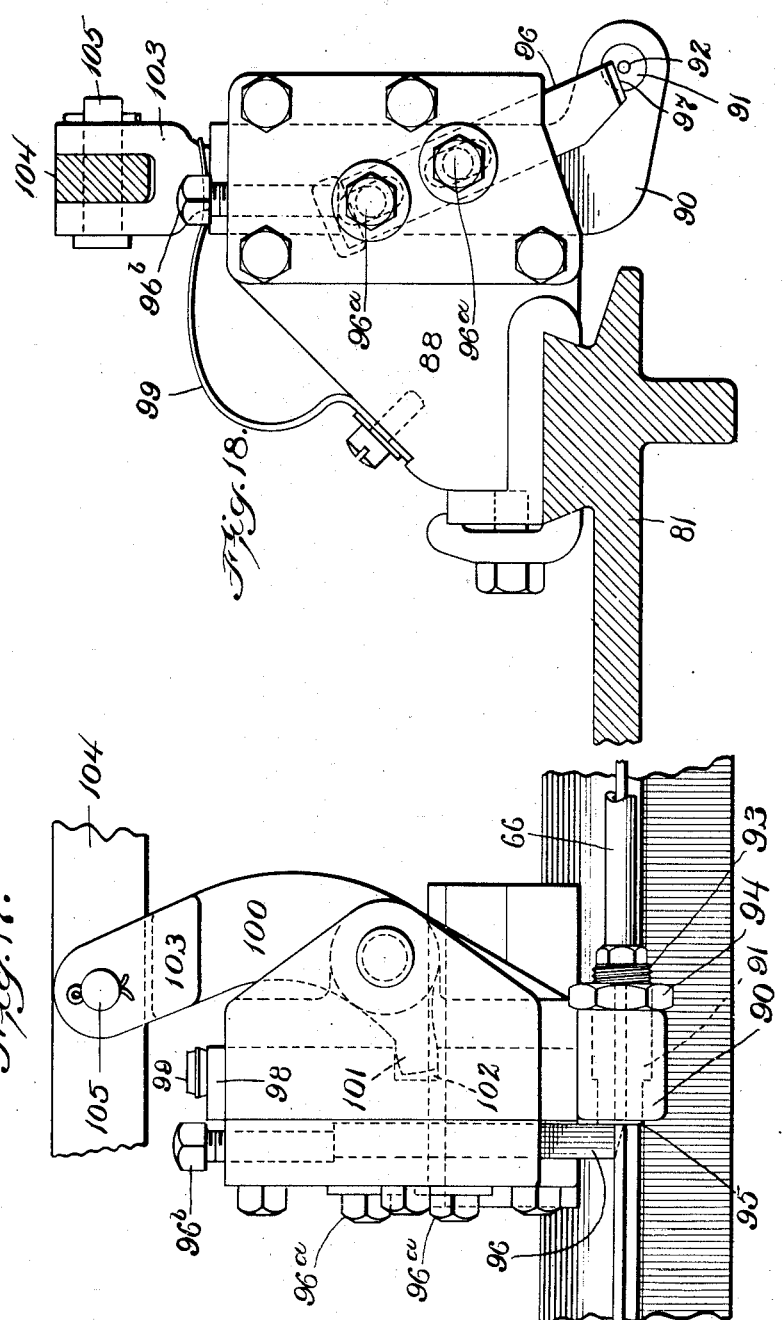

No. 813,823. PATENTED FEB. 27, 1906.
J. C. PERRY.
MACHINE FOR MAKING WIRE GOODS.
APPLICATION FILED APR. 25, 1903.
20 SHEETS—SHEET 13.
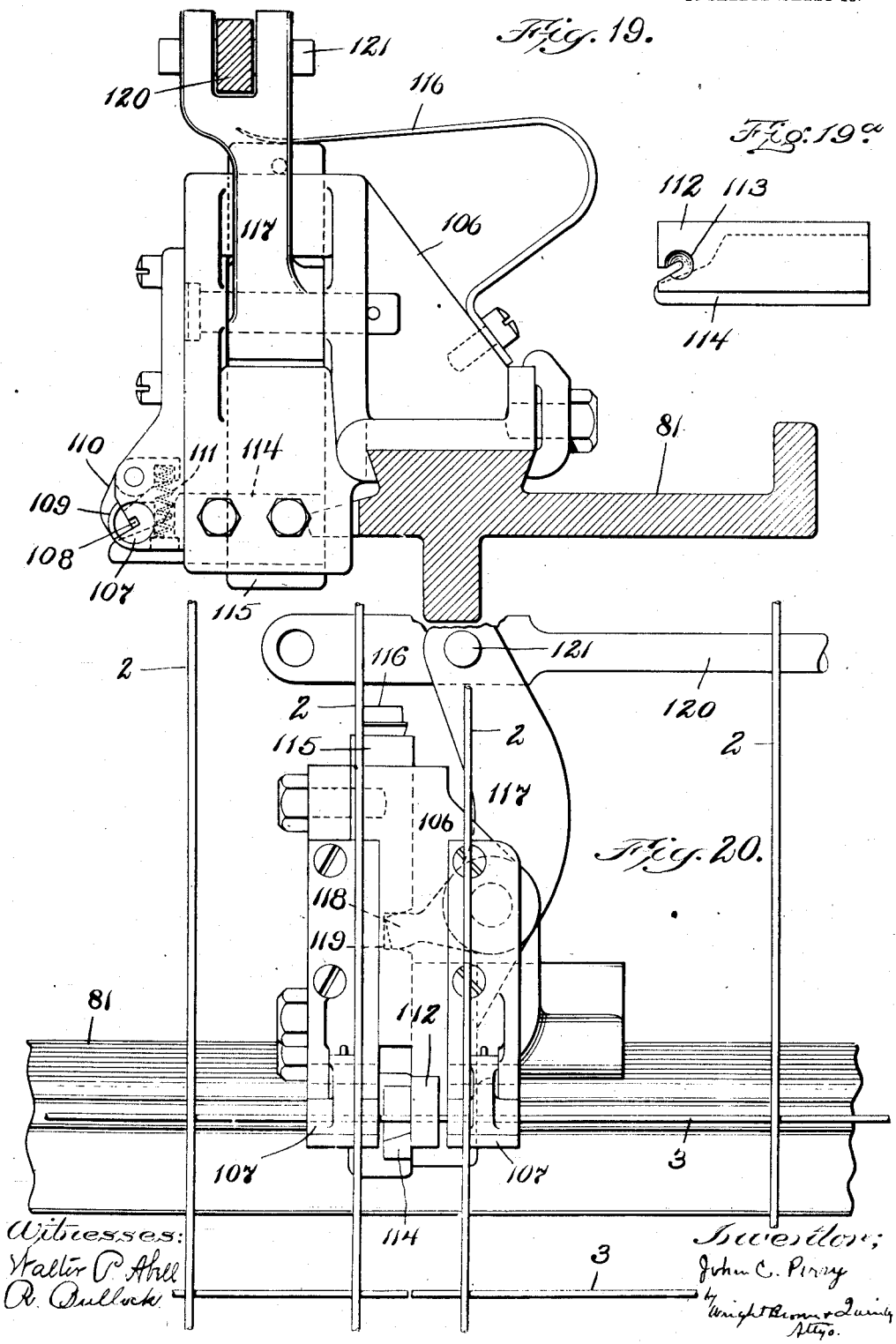

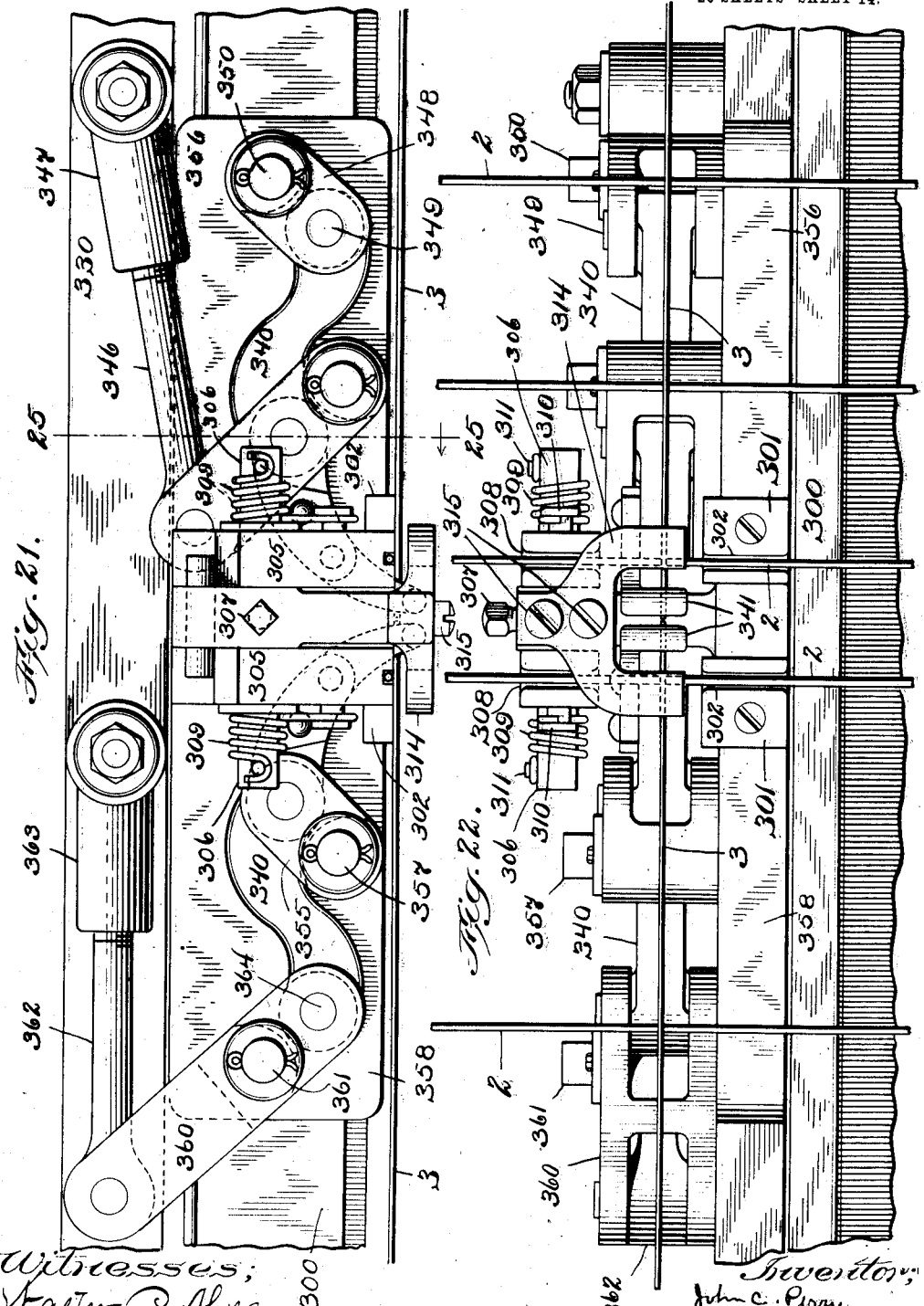

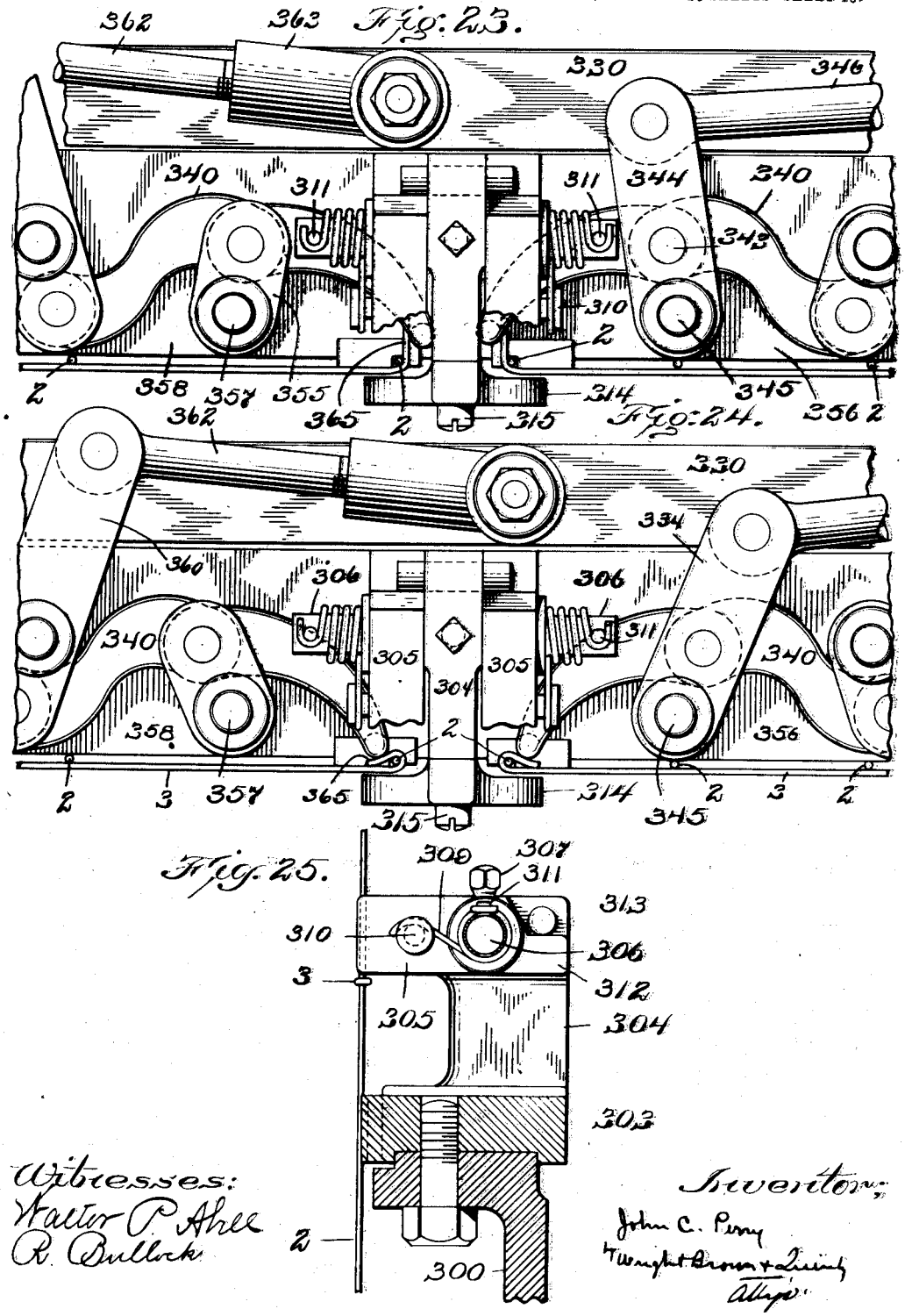

No. 813,823. PATENTED FEB. 27, 1906.
J. C. PERRY.
MACHINE FOR MAKING WIRE GOODS.
APPLICATION FILED APR. 25, 1903.
20 SHEETS—SHEET 16.

Witnesses:
Walter P. Abell.
R. Bullock.

Inventor:
John C. Perry
by Wright Brown + Quinby
Atty.

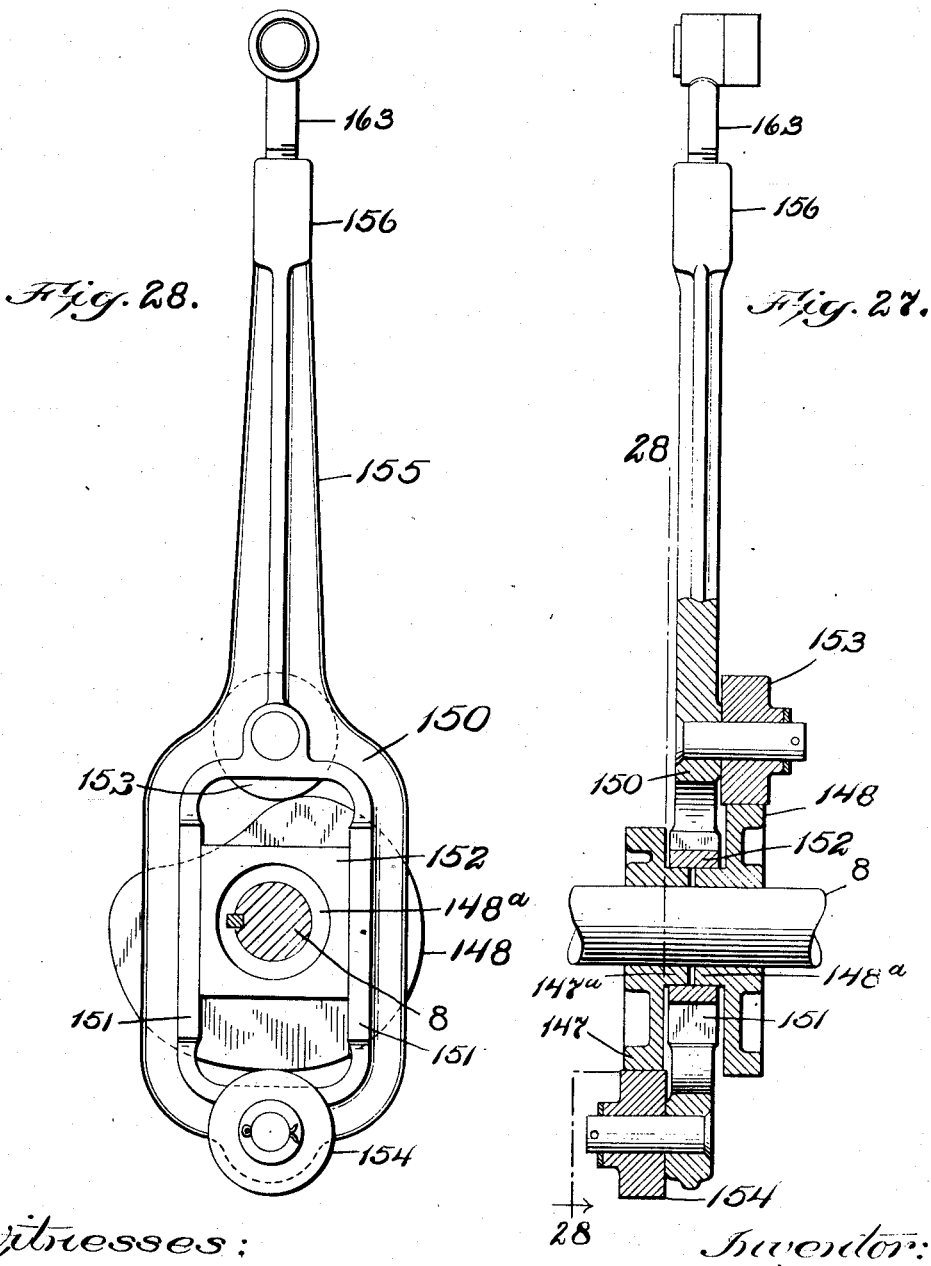

No. 813,823. PATENTED FEB. 27, 1906.
J. C. PERRY.
MACHINE FOR MAKING WIRE GOODS.
APPLICATION FILED APR. 25, 1903.
20 SHEETS—SHEET 18.
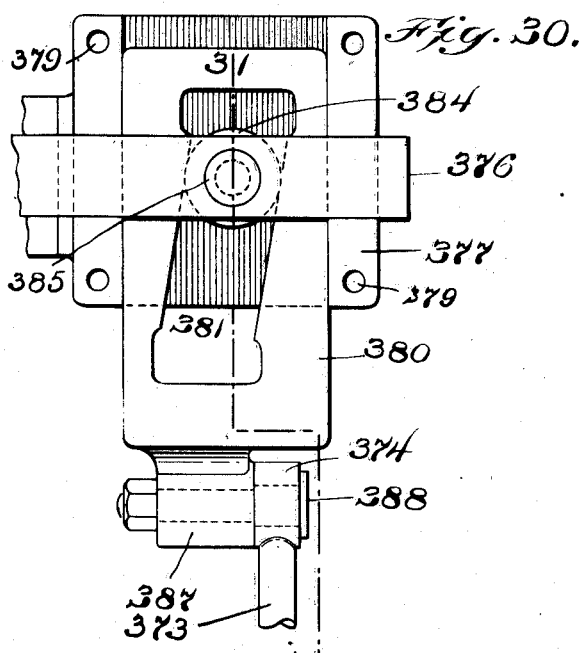
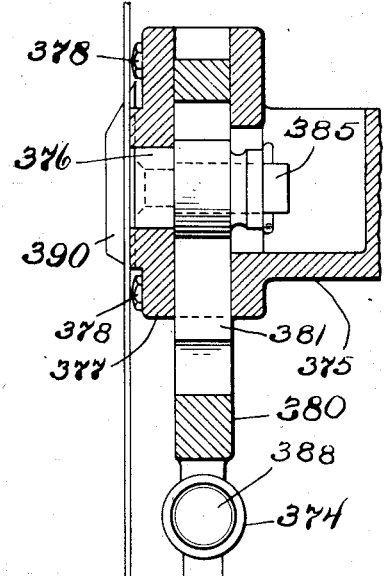
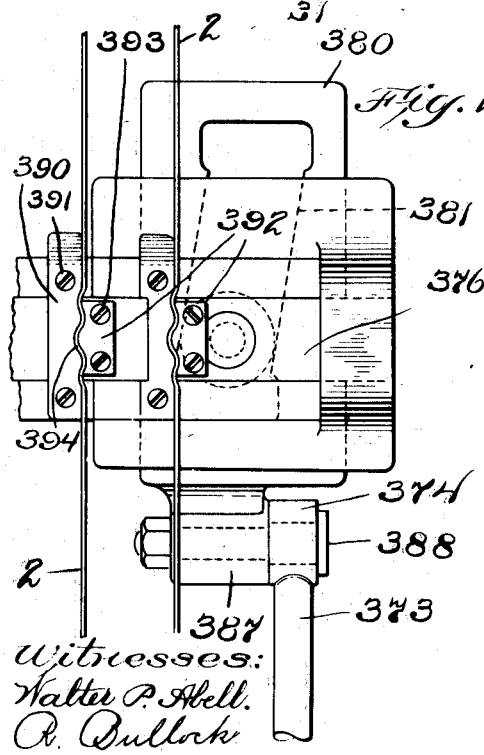
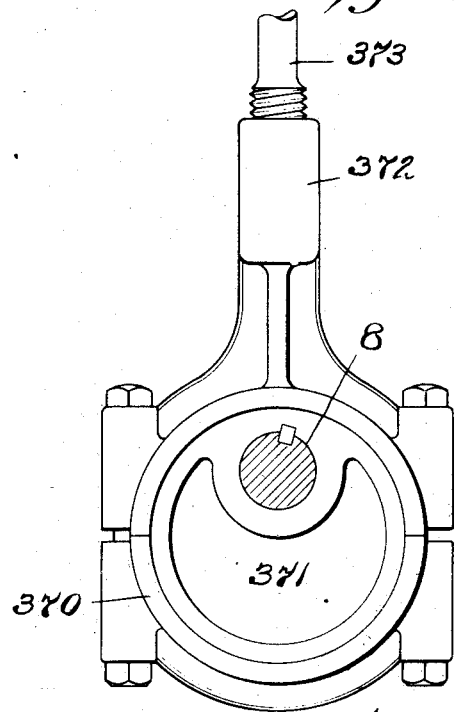
Witnesses:
Walter P. Abell.
R. Bullock
Inventor:
John C. Perry
by Wright Brown & Quinby
Attys.

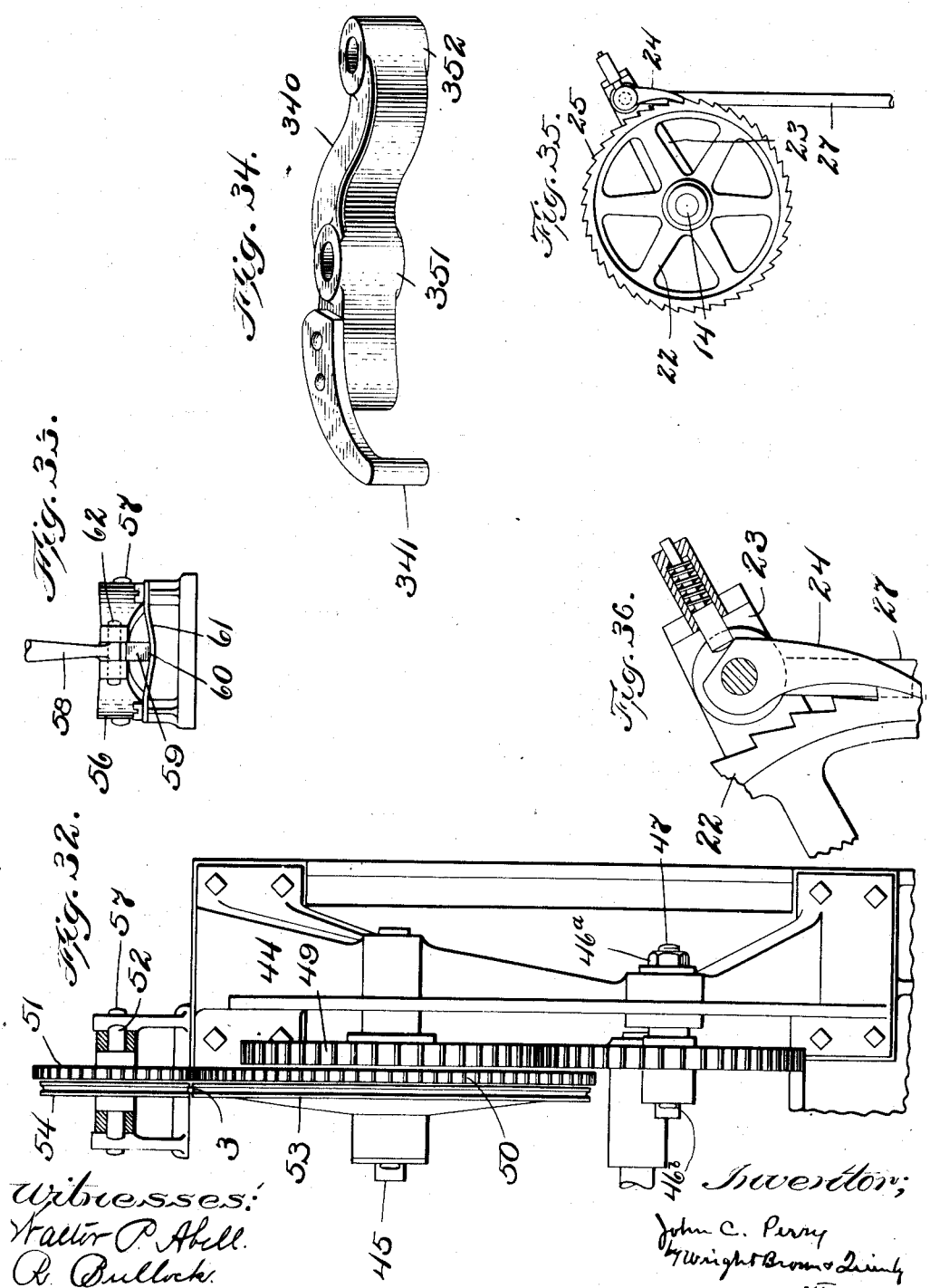

No. 813,823. PATENTED FEB. 27, 1906.
J. C. PERRY.
MACHINE FOR MAKING WIRE GOODS.
APPLICATION FILED APR. 25, 1903.
20 SHEETS—SHEET 20.
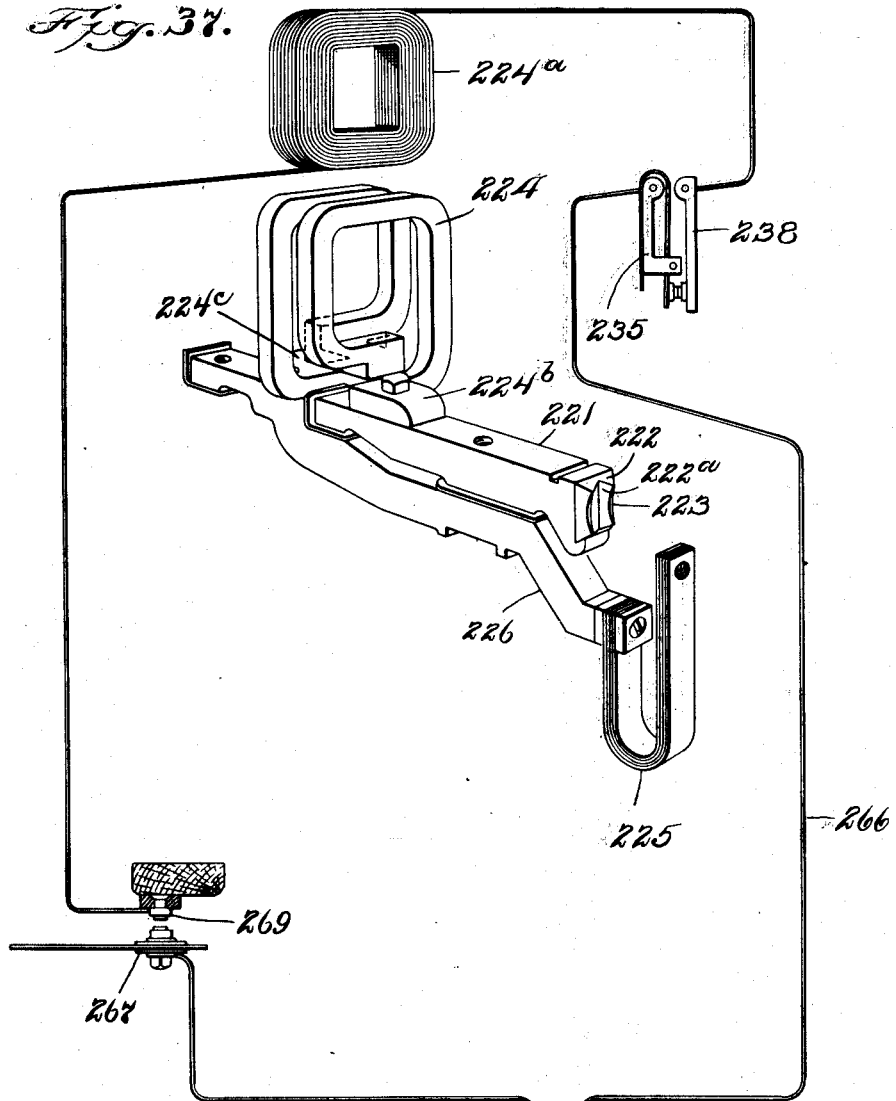

UNITED STATES PATENT OFFICE.

JOHN C. PERRY, OF CLINTON, MASSACHUSETTS, ASSIGNOR TO CLINTON WIRE CLOTH COMPANY, OF CLINTON, MASSACHUSETTS.

MACHINE FOR MAKING WIRE GOODS.

No. 813,823.     Specification of Letters Patent.     Patented Feb. 27, 1906.

Application filed April 25, 1903. Serial No. 154,364.

*To all whom it may concern:*

Be it known that I, JOHN C. PERRY, of Clinton, in the county of Worcester and State of Massachusetts, have invented certain new and useful Improvements in Machines for Making Wire Goods, of which the following is a specification.

This invention relates to machines for making wire goods, such as fences, mats, lathing, barbed wire, &c.

Figure 1, in front elevation, shows a machine constructed in accordance with my invention. Fig. 2 is a rear elevation with bracket removed that carries the take-up roll. Fig. 3 is a left end elevation. Fig. 4 is a right end elevation. Fig. 4ª is a detail of the eccentrics which actuate the crimpers and the stay-wire carriers. Fig. 5 is a vertical cross-sectional view on the line 5 5 of Fig. 1 looking in the direction of the arrow, showing the welding-jaws closed and a carrier about to grasp a fresh stay-wire. This view shows also the feed of the strand-wire into the machine and the welded goods over the drum and down to the winding-roll. Fig. 6 is a like view, on a larger scale, showing the welding-jaws open, some of the mechanism at the rear of the machine being omitted. Fig. 7 is a like view, on the same scale as Fig. 6, showing the welding-jaws closed with the wire grasped between them and the carrier returned part way to its initial position. Fig. 7ª is a detail view of one of the plunger-rods or pistons that carry the movable welding-jaws. Fig. 8 is a vertical cross-sectional view on the line 8 8 of Fig. 1 looking in the direction of the arrow and showing the draw-bar mechanism for opening and closing the welding-jaws, also the sliding girth for supporting and carrying said jaws, also the sliding girth carried by the draw-bar mechanism to set the circuit-breakers. Fig. 9 is a detail view showing in side elevation the mechanism for feeding the cross or stay wire and in the act of feeding the latter. (See Fig. 32 for an end elevation.) Fig. 9ª is a detail section of the gears for effecting the intermittent feed of the stay-wire. (See line *a a* of Fig. 9.) Fig. 10 is a like view showing the motion-losing device in operation. Fig. 11 is a detail sectional view taken on the line 11 11 of Fig. 2 looking in the direction of the arrow, showing one of the gang of electrical switches in its open position. Fig. 12 is a like view showing the switch in its closed position. Fig. 13, in side elevation, shows one of the carriers in position to grasp a stay-wire held by a receiver shown in Fig. 15 and to remove it therefrom and place it against a strand-wire in position to be grasped by the welding-jaw, the path of the end of the carrier being indicated by the arrows. Fig. 14 is a similar view showing the stay-wire grasped by the carrier. Fig. 15 is a detail view of a receiver in closed position, the path of a complemental carrier being indicated by arrows. Fig. 16 is a similar view showing the receiver as it is opened by the carrier removing a stay-wire therefrom. Fig. 17, in rear elevation, shows the stay-wire cutter located at the stay-wire-feed end of the machine, also the sleeve through which the stay-wire is fed into the machine and against whose inner face (the left in this figure) the cutting edge or side of the knife slides. This cutter severs the blanks from the wire-roll. Fig. 18 is an end elevation of the parts shown in Fig. 17 as seen from the inside of the machine looking toward or against the direction of the stay-wire feed. Fig. 19, in end elevation, shows a cutter designed to sever the stay-wires to divide the goods into two or more strips, depending upon the number of said cutters, said cutters in the form of machine shown being located above or beyond the plane of the welding-jaws. (See Fig. 1.) Fig. 19ª is a detail of the two shearing members of said cutter. Fig. 20 is a rear elevation of the mechanism shown in Fig. 19. Fig. 21, in top plan view, shows a double-coiling mechanism for coiling the ends of the stay-wires over their respective strand-wires after the stay-wires have been severed by the cutter shown in Figs. 19 and 20, the coilers being located above the cutters in the form of machine shown. Fig. 22 is a front elevation of the coiling mechanism shown in Fig. 21. Fig. 23 is a view similar to Fig. 21, showing the first operation of the coiling-fingers. Fig. 24 is a like view showing the second or final operation of the coiling-fingers. Fig. 25 is a cross-sectional view on the line 25 25 of Fig. 21 looking in the direction of the arrow and showing the means for permitting the coiled ends of the stay-wire to be pulled out of its supporting groove or finger. Fig. 26 is a diagrammatic view of the primary circuits, whose switches, one shown closed, are operated by the mechanisms shown in Fig. 11. Fig. 27 is a partial sectional view of a cam-roll lever that actuates the stay-wire carriers. Fig. 28 is a section on the line 28 28 of Fig. 27 looking in the direction of the arrow. Fig. 29 is a detail view of the strand-wire-crimping jaws. Fig. 30 is a similar view, but in another position and with the rear plate omitted. Fig. 31 is a sectional view on the line 31 31 of Fig. 30, showing in addition the actuating eccentric or cam. Fig. 32 is a detail view showing in end elevation the stay-wire-feed mechanism shown in side elevation in Fig. 9. Fig. 33 is a detail view of the handle for releasing the top stay-wire-feed wheel. (See Fig. 9.) Fig. 34 is a detail perspective view of one of the coiling-fingers. Fig. 35 is a detail view of the ratchet-wheel for effecting the feed of the strand-wires. Fig. 36 is a detail view of the ratchet shown in Fig. 35. Fig. 37 is a perspective view showing the primary coil and its circuit and the secondary coil and its terminals and bars. In this view the primary coil is shown as raised out of its place between the two members of the secondary coil in order to show the arrangement of the parts. Fig. 38 is a detail view of a secondary coil.

1 represents the framework of the machine of suitable form and arrangement to carry and support the various parts to be supported thereon.

2 represents strand-wires fed into the bottom of the machine and corresponding somewhat to the warp in a loom. The number and size and shape of these strands will vary according to the kind of goods to be made.

3 represents a stay-wire corresponding somewhat to the weft in a loom and here shown as fed in from the side of the machine, Figs. 1, 2, 3, and 4. Manifestly the wires 2 and 3 may be fed in from any part of the machine. The arrangement here shown is convenient, but not indispensable, the essential point being to select for location of feed-places in the machine where the strand and stay wires can readily be given the desired arrangement with respect to each other for the described purposes.

Referring to Fig. 3, power is applied to the machine by means of a belt 4 from a suitable source of power arranged upon the pulley 5, fast on the counter-shaft 6, carried by a bracket 7, extending from the rear of the machine. 8 represents a counter-shaft arranged on the lower part of and extending the entire length of the framework of the machine. (See Fig. 2.) From the rotation of the shaft 8 the several movements of the machine are timed. 9 represents a spur-gear fast upon the end of the shaft 8. 11 represents a counter-shaft mounted in the bracket 7 between the shaft 6 and the shaft 8. Upon this shaft 11 is secured a spur-gear 12, meshing with a gear 10, fast upon the shaft 6, and a spur-gear 13, meshing with the gear 9, whereby motion is imparted to the shaft 8.

Referring to Figs. 1, 2, 3, 4, and 5, 14 represents a shaft mounted in the top of the framework and extending the entire length of the machine. 15 represents a loose pulley on the right-hand end of the shaft 14. (See Fig. 4.) 15$^a$ represents a ratchet-wheel fast on the end of the shaft 14 and arranged adjacent to the loose pulley 15 with its teeth arranged to drive in the direction of the hands of a watch. (See Fig. 4.) A spring-pawl 15$^b$ is pivoted to a spoke of the pulley 15 and has its free end arranged to engage the teeth of the ratchet-wheel 15$^a$. By this arrangement the pulley 15 is turned by the shaft 14, but may be turned in the same direction by hand independent of the shaft 14 in order to take up the slack by the take-up roll when starting a new roll of material or for any other purpose. 16, Figs. 4 and 5, represents a split roll having trunnions 17, that are mounted in suitable bearings in the bracket 7. 18 represents a pulley fast on the trunnion 17 at the right-hand end of the machine. 19 represents an idle or tension pulley carried by a lever 20, that is pivoted to the upper end of an arm 21, carried by the bracket 7 in such way that the pulley 19 is in the same vertical plane as the pulley 18 and rests upon the belt 21$^a$, that is arranged upon the pulley 15 and pulley 18, passing under the tension-pulley 19. By this means motion is imparted to the take-up roll 16, and provision is made to maintain a proper tension on the belt 21$^a$. A ratchet or other adjusting means 19$^a$ may be mounted upon the bracket 7 and connected to the free end of the lever 20 to adjust the strain of the pulley 19.

Referring to Fig. 3, 22 represents a ratchet-wheel fixed upon the left-hand end of the shaft 14. 23 represents a lever one end of which is pivoted upon the shaft 14 adjacent the wheel 22. The opposite end of said lever carries a spring-pressed ratchet-pawl 24, arranged to engage the teeth 25 of the ratchet-wheel to turn the latter. When the lever 23 is moved in a direction corresponding to that of the hands of a watch, Fig. 3, it will not affect the ratchet-wheel 22. 26, Fig. 3, is a spring-detent connected to the framework at one end and engaging the ratchet-teeth 25 at its other end in order to prevent reverse motion of the ratchet-wheel. 27 represents a lever pivoted at one end to the front end of the lever 23 and provided at its other end with a bolt 28, that is arranged in a radial slot 29, formed in one of the arms of the wheel 9. By this arrangement the throw of the lever can be increased or diminished in order to regulate the motion or amount of turn given the wheel 22, and thereby the shaft 14. As the gear 9 rotates the lever 27 is given a reciprocating motion, moving the lever 23 up and down, and thereby turning the ratchet-wheel 22.

Referring to Figs. 1, 2, 3, and 5, 30 represents a series of feed-wheels rigidly mounted upon the shaft 14. The number, arrangement, and distance apart of these wheels depend upon the number of the strand-wires 2, the arrangement of the latter and the distance they are to be spaced apart in the finished goods. Each wheel 30 is formed with a series of pairs of spur-teeth 31. The strand-wires in the operation of the machine are arranged between the teeth 31, while the stay-wires or cross-wires 3 are engaged by the teeth 31, (see Fig. 1,) and in this way the strand-wires are pulled into the machine and the wire fabric fed along in predetermined order. It will be seen that as motion is imparted to the shaft 14 by means of the ratchet-lever 23 the wheels 30 will be rotated, while at the same time by means of the belt 21ᵃ the take-up roll 16 will be turned to take up the goods fed by the wheels 30, the pressure of the pulley 19 being sufficient to cause the roll 16 to keep the strand-wires carrying the stay-wires sufficiently taut for the purposes of the machine, and also permitting "slip" of the belt 21ᵃ as the roll of goods on the roll 16 increases in diameter.

Referring to Figs. 1 and 5, the strand-wires 2 are fed in from the bottom of the machine about the rolls 33, that extend the length of the machine, in order to straighten the wires and produce sufficient drag on the wires after they leave the rolls 33 to permit the subsequent operations. 34 represents a roll extending the length of the machine carried by arms 35. This roll is arranged adjacent the wheels 30 to assure the proper engagement of the strand and stay wires with the wheels 30, and also the engagement of the stay-wires with the other mechanism below the wheels 30. 35ᵃ represents a similar roll carried by arms 35ᵇ in the rear of the machine to receive the strand-wires 2 and stay-wires 3 as they leave the wheel 30. The goods after leaving the crimping device hereinafter described pass back of rolls 36, that extend the width of the machine (see Figs. 2 and 5) and thereafter pass to the take-up roll 16. The foregoing description shows the general direction and character of the feed of the strand-wires and material through the machine to the take-up roll 16. 40 represents a cross-shaft mounted in suitable bearings in the lower left-hand end of the machine. (See Figs. 1 and 3.) 41 represents a beveled gear fast on the rear end of the shaft 40, arranged to mesh with a beveled gear 42, fast on the shaft 8. (See Fig. 3.) Upon the opposite end of the shaft 40 is loosely mounted a spur-gear 43. (See Fig. 1.) 44 represents a bracket at the left-hand end of the machine. 45 represents a short shaft mounted in the upper part of this bracket. 46 represents an arc slot formed in the lower part of the bracket 44, the center of whose circle is represented by the shaft 45. 47 represents a short shaft arranged in the arc slot 46 and held in place by a nut 46ᵃ (see Fig. 1) and a collar and pin 46ᵇ, (see Fig. 2,) whereby said shaft may be adjusted and locked at any desired point in said slot. 48 represents a spur-gear on the shaft 47 and meshing with the gear 43. 49 represents a spur-gear on the shaft 45, meshing with and driven by the gear 48. The speed of the gear 49 can be varied by changing the size of the gear 43, the arc slot 46 serving as a means to adjust the gear 48 so it will mesh with the gear 43 and the gear 49 irrespective of the size of the gear 43. Upon the shaft 45, just back of the gear 49, is rigidly mounted a spur-gear 50, (see Figs. 1 and 32,) that meshes with the gear 51, mounted upon a short shaft 52 above the shaft 49. This shaft 52 is carried by a pivoted framework 56, hereinafter described. Upon the shaft 45, back of the gear 50, (see Figs. 2 and 3,) is arranged a grooved pulley 53, just beneath and adapted to coact with a smaller complemental grooved pulley 54, mounted on the shaft 52.

Referring to Figs. 9, 10, and 33, 55 represents an arm projecting up from the frame 1. To this arm is pivoted a frame 56 by means of a pintle 57. The shaft 52 is arranged in the forward end of this framework. 58 represents a handle pivoted to a rear extension of the frame 56. On its lower side the handle 58 is formed with two flat faces 59 and 60, arranged to engage a spring 61. The face 60, when in engagement with the spring 61, serves to keep the wheel 54 spring-pressed toward the wheel 53 with sufficient force to feed the stay-wire 3. The face 60 is farther from the pintle 62 than is the face 59, so that when the handle is turned to bring the face 59 against the spring 61 this spring-tension is sufficiently removed so the wheel 54 may be lifted from the wheel 53. A lug 64 on the face 59 by engaging the spring 61 serves to prevent the handle being turned too far. If for any reason it is desired to raise the wheel 54 in order to manipulate the stay-wire 3, the end of the handle 58 is depressed to bring its face 59 into engagement with the spring 61, thus relieving the frame 56 from the tension of the spring 61 and permitting the wheel 54 to be lifted up. 65 represents a pipe through which the stay-wire 3 passes before reaching the peripheries of the wheels 53 and 54. 66 represents a similar pipe through which the stay-wire 3 passes after leaving the wheels 53 and 54. 67 represents a series of straightening-rolls through which the stay-wire 3 passes before it enters the pipe 65.

Referring to Figs. 9ᵃ and 10, 43ᵃ represents an extension of the hub of the gear 43. Upon this extension 43ᵃ and rigidly secured thereto is arranged a ratchet-wheel 69. The gear 43 and ratchet-wheel 69, turning on the shaft 40, is an integral device. 70 represents an arm rigidly secured on the shaft 40 and adjacent the ratchet-wheel 69. To the free end of this arm 70 is pivoted a pawl 71. A spring 72 serves to yieldingly hold the pawl 71 in engagement with the teeth of the ratchet-wheel 69. 73 represents an arm secured to the framework and carrying at its free end a roller 74, arranged in the path of an extension 75 of the pawl 71. The arrangement is such that as the shaft 40 is rotated it carries with it the arm 70. So long as the pawl 71 is in engagement with the teeth of the ratchet-wheel 69 the ratchet-wheel 69 and gear-wheel 43 will be turned, thus turning the gear-wheels 48 and 49 and effecting the feed of the stay-wire. When, however, the extension 75 is engaged by the roller 74, the pawl 71 is freed from its engagement with the ratchet-wheel 69, and the latter will remain stationary during such movement of the arm 70 as is necessary to free the extension 75 from the roller 74. In the form shown the pawl 71 is freed during the distance of one of the twelve teeth of the ratchet, and during this portion of the cycle of movement of the parts there is no feed of the stay-wire. It is during this interval in the form of machine shown that the wire is severed and transferred to the welding-jaws. Manifestly the pawl may be lifted at different points and for any desired interval, depending upon the arrangement of the parts for lifting the pawl 71 and the duration during which it is kept freed from the ratchet. The shaft 40 is continuously driven in the same direction, and while the pawl 71 is in engagement with the ratchet 69 the wheels 53 and 54 will be driven in the same direction and at the same peripheral speed. When, therefore, the stay-wire 3 is gripped by said wheels, as shown in Fig. 9, and the pawl 71 is in engagement with the ratchet, the stay-wire is fed into the machine, and this feeding action continues until the pawl 71 is dropped, as hereinafter described, at which time the feeding action ceases and is not resumed until the pawl engages the next tooth of the ratchet. While in the form shown the feeding action of the stay-wire is interrupted at one-twelfth part of the cycle of a ratchet, I do not wish to be understood as limiting myself to such arrangement, since the feeding of the stay-wire may be by means of the principle illustrated modified to suit the character of the work being done by changing the number of the teeth of the ratchet and arranging one or more of the rollers 74 and extending or diminishing the time the pawl is held out of engagement with the ratchet.

Referring to Figs. 1, 7, 13, 14, 15, and 16, 80 represents a series of arms secured at predetermined points along the front girth 81 of the machine projecting from the inner side of said girth, as shown in Figs. 1 and 4. These arms correspond in number to the strand-wires 2 and are arranged in close proximity to the plane of the strand-wires that pass up through the machine. Each arm 80 is mounted upon a dovetailed rib 80$^c$ of the girth 81 and is formed at its rear with a lip 80$^a$, arranged under the rear part of said dovetailed rib, while a clamp 80$^b$ engages the front of each arm and the under side of the front of the dovetailed rib. Each arm 80 is formed with an enlargement 82, the center of which is provided with an aperture 83. 84 represents a segment of the enlargement 82, that is carried by a pivoted arm 85. A spring 86, engaging an extension 87 of the arm 85, serves to yieldingly hold the segment 84 in the position shown in Fig. 15, but at the same time permits the displacement of the segment sufficiently to allow the removal of the stay-wire 3, as shown in Fig. 16. The enlargement 82 constitutes a receiver, and the face of the receiver opposite the direction of feed of the stay-wire is concaved, as shown in order to facilitate the passage of the wire through the aperture 83. Between the first receiver or the receiver at the left hand of the machine in Fig. 1 and the inner end of the pipe 66 a casting 88 is secured to the girth 81. (See Fig. 18.) In this casting is secured a slide 98, having a lug 90, arranged in the same plane as the receivers 82. This lug is cored out, and in the core is arranged a screw-threaded thimble 91, formed with an aperture 92, corresponding to the aperture 83 of the receiver. On the outer end 93 of the thimble 91 is arranged an adjusting-nut 94, by which the inner end 95 of the thimble 91 may be advanced or receded to bring its face close to the plane of the cutting edge of the knife 96. The pipe 66 has its inner end attached to the outer end of the thimble 91, so that the thimble forms, in effect, a continuation of the passage through the pipe. The knife 96 has a cutting edge 97, arranged in close contact with the end 95 of the thimble 91 to sever the wire. By having this cutting done at the point stated I am enabled to effect a clear shear of the wire and at the same time have the end of the blank ready for the next feed. The knife 96 is arranged in a suitable way in the casting 88 and held in place by bolts 96$^a$. (See Fig. 18.) 96$^b$ represents an adjusting-screw arranged to engage the upper end of the knife 96 to maintain the knife in any position of vertical adjustment against thrusting action of the wire in the cutting operation. A spring 99 is connected at one end to the casting 88 and at its other end to the upper end of the bar 98 and serves to keep the latter and the lug 90 in their depressed or inoperative position. 100 represents an arm pivoted in the casting 88 and formed with a toe 101, arranged in a recess 102 in the bar 98. As the upper end of the arm 100 is moved to the right, in Fig. 17, it causes the thimble 91 to be forced up across the edge 97 of the knife 96 to sever the stay-wire 3. The arm 100 at its upper end is formed with a fork 103, that straddles a connecting-rod 104 and is pivoted to the said rod by a pintle 105. 106 represents a casting secured on the girth 81 about midway of the machine. (See Figs. 1, 19, and 20.) This casting upon its back side is provided with two receivers 107 in the same plane as and constituting a substantial duplicate of the receivers 82. Each receiver 107 is formed with an aperture 108 and also further formed with a segment 109, that is carried by the free end of a lever 110. The rear end of this lever is engaged by a spring 111, which normally tends to keep the segment 109 in place, but permits the displacement of the segment to allow the removal of the stay-wire 3 therefrom. 112 represents a lug projecting from the casting 106 between the two receivers 107. This lug is formed with a cone-shaped aperture 113, from which a segment is removed, leaving an opening corresponding to the opening in the receivers 107 with the segment 109 removed. 114 represents a knife bolted to a sliding bar 115. 116 represents a spring connected at one end to the casting 106 and at its other end to the sliding bar and normally keeping the bar and knife in the lower or inoperative position. 117 represents a lever pivoted to the casting 106. This lever is formed with a toe 118, arranged in a recess 119 of the bar 115. The upper end of this lever is forked to embrace a connecting-rod 120, to which it is pivoted by a pintle 121. The connecting-rod 120 is joined to the rod 104 by a bar 122. When the rods 120 and 122 are connected together, they will operate in unison. If it is desired not to use the knife 114, the bar 122 may be removed. As the rod 120 is moved the knife 114 is raised to sever the stay-wire 3. In the arrangement shown the stay-wire 3 is cut off from the blank by the knife 96 and further severed into two pieces by the knife 114 at the same time and while the wire is held by the receivers. Any number and arrangement of knives corresponding to the knife 114 may be employed, depending upon the number and the lengths of the pieces into which it is desired to cut the stay-wire strip that is fed into the machine. If it is desired to form the fabric into two parts, one knife will do. If it is desired to form barbs upon the wire, the knives may be arranged to give a beveled cut to the wire. To the end of the rod 104 is pivoted the upper end of an arm 125, projecting upwardly from a hub 126, pivoted upon the left-hand end of the frame. (See Figs. 1 and 3.) The hub 126 is provided with a downwardly-extending arm 127, that carries a roller 128, adapted to be engaged by a cam 129 on the inner face of the gear-wheel 9. The engagement of the cam 129 with the roller 128 is timed to take place just after the feed of the stay-wire 3 into the machine has ceased, due to the tripping of the pawl 71. As the cam 129 engages the roller 128 it forces the end of the arm 125 to the front in Fig. 3, or to the left in Fig. 1, thereby operating the levers 117 and 100 to operate their respective cutters. 130 represents a coiled spring connected to the arm 125 at one end and to the framework of the machine at the other. (See Fig. 2.) The action of this spring is to return the end of the lever and the connecting-rod 104 to their initial positions after the throw of the lever to operate the cutter.

Referring to Figs. 1 and 3, 140 represents a lever pivoted to the left-hand end of the machine by the stud 141.

Referring to Figs. 1 and 4, 142 represents a complemental lever pivoted at the right-hand end of the machine by means of the stud 143. 145 represents a rod that extends the whole length of the machine. (See Fig. 1.) The ends of this rod are arranged in the front ends of the levers 140 and 142, respectively, but are capable of being turned in their bearings. To the rear end of each lever 140 and 142 is pivoted a pitman 146. (See Figs. 5, 6, 7, and 8.) 146$^a$ represents an eccentric rigidly mounted upon the shaft 8 at each end of the machine. (See Fig. 5.) Upon each eccentric is arranged an eccentric-strap 146$^b$ in the usual way. 146$^c$ represents a screw-threaded extension of said strap adapted to engage with the screw-threaded end of the pitman 146. By this engagement the levers 140 and 142 are rocked in unison, giving an up-and-down movement of the rod 145 in the arc of a circle whose center is represented by the pintles 141 and 143, Fig. 3. 158 represents a lever, one end of which is keyed to the shaft 145. (See Figs. 7 and 8.)

Referring to Fig. 4, 159 represents a short shaft loosely mounted in the framework of the machine adjacent the shaft or pintle 143. To the inner end of this shaft is rigidly secured a lever 160. 161 represents a link connecting the end of the lever 160 to the end of the lever 158. 162 represents an arm secured to the outer end of the shaft 159. (See Fig. 4.) 163 represents a pitman connected to the end of said arm 162 and screw-threaded at its lower end. 147 and 148 represent a pair of complemental cams, fast on the shaft 8. (See Figs. 27 and 28.) These cams are formed with flanges 147$^a$ and 148$^a$, that together form a bearing upon which is loosely mounted a square block 152, the two cams being keyed to the shaft. Cam 147 is a complement of cam 148 in every particular, the highest throw of one cam being directly opposite the highest throw of the other, and so on. 150 represents a strap having a block-slide 151 upon the block 152. This compels the reciprocation of the slide in a vertical direction irrespective of the action of the cams. 153 represents a roller carried by the upper end of the strap 150 and engaging the cam 148. 154 represents a roller connected to the lower end of the strap 150 and arranged to engage the cam 147. By this construction it will be seen that the strap 150 is positively thrown in either direction by the cams precisely as would be the case of a cam on the shaft provided the cam-path on one of its sides in which was arranged a pin connected to the strap 150. The present construction, however, is far preferable, both from the point of economy and from the point of efficiency and strength. 155 represents the arm of the strap. This is shown as provided with a socket 156, with which the screw-threads on the ends of the pitman 163 engage. By this construction as the shaft 8 rotates an oscillating motion is given to the shaft-rod 145 in its bearings. The extent of this oscillating motion may be varied as desired. 170 represents a series of hubs rigidly secured upon the shaft 145. (See Figs. 1, 13, and 14.) In practice the end of these hubs 170 and the arms 80 are arranged in staggered planes— that is, one just in advance of the other. Each hub 170 is provided with an arm 172, formed with a lug 173 upon its lower side, in which is pivoted a lever 174. A spring 175 is arranged between the rear end of this lever and the arm 172 in order normally to throw the front end 176 of this lever toward the free end of the arm 172. 177 represents a plate secured to the free end of the arm 172. This plate at its forward end is notched, as at 178, in order to receive a stay-wire 3 and have the same yieldingly maintained in said notch by means of the spring-arm 174. The end of this arm 172 has a compound motion, due to the rocking of the shaft 145 by means of the arm 158 and to the movement of translation of the shaft 145 due to the motion of the levers 140 and 142. This path of motion is indicated by an arrow-line, Figs. 13, 14, and 15. The notches 178 normally are above and adjacent the position of the holes 83 in the receivers. (See Fig. 6.) After the feeding and cutting of the wire is completed the motion of the arm 172 causes the engagement of the wire by the arm 177. (See Fig. 13.) Thereafter the notch engages the wire. (See Fig. 14.) The continued motion of the arm along the arrow-line pulls the stay-wire 3 out of the receiver, Fig. 16, and transports it in a downward direction, Figs. 13 and 14, against the strand-wires 2 in front of the stationary welding-jaw. (See Fig. 6.) At this point the wire is grasped by the movable welding-jaw, hereinafter described, the arm 172 continues on its cycle, the wire 3 being pulled out of the notch 178 as the arm 172 moves backward and upward to its initial position, as indicated by the arrow-path in Figs. 14 to 16. The carriers and their motions and functions are so timed that they transport the wire after it is severed to the welding-jaw, where said wire is immediately grasped and welded, and as all of the carriers receive precisely the same motion from the shaft 145 the wire is grasped by the several carriers simultaneously and carried to the position accurately to be seized by the welding-jaws.

Referring to Fig. 8, 200 represents a movable girth extending the whole length of the machine and sliding in suitable bearings 201. This girth is in front of and below the girth 81. (See Fig. 5.) 203 represents two pitmen, one at each end of the machine. Each pitman is connected at one end to said girth (see Fig. 8) and passes through suitable ways in the rear stationary girth 204. (See Fig. 8.) 205 represents two levers, one at each end of the machine. Each lever 203 is pivoted at 206 to the upper end of the framework of the machine at the upper rear side. (See Figs. 2, 3, 4, and 5.) Each lever at its lower end is provided with a roller 207, arranged to engage the rear side of a cam 208, fast on the shaft 8. 209 is an arm extending from the lever 205 above the shaft 8. This arm extends down over the cam 208 to a point opposite that occupied by the lower end of the arm 207 and is provided with a roller 210, that engages the cam 208 opposite the point where that cam is engaged by the roller 207. By this arrangement each lever 205 is positively oscillated on its pivot 206. The action of the cam 208, in connection with the two rollers 207 and 210, is like that of the mechanism shown in Figs. 27 and 28. The arrangement of the rollers 207 and 210 in relation to the cam 208 is shown in Fig. 5, where the cam is located back of the eccentric 146$^a$. This arrangement gives to the movable girth 200 a uniform and even reciprocating motion in its ways. This girth 200 is formed with a series of holes 212. In each hole 212 opposite each strand-wire 2 is arranged a piston 213, formed with a squared shoulder 213$^a$, arranged in a complemental part of the hole 212 to keep the piston from turning. (See Fig. 7$^a$.) Each piston 213 is formed with a rod 215, extending through the front of the girth 216, and is held in place by nuts 217. Upon each rod between the shoulder 213$^a$ and the front girth 216 is arranged a powerful coiled spring 214, (see Fig. 6,) so that each piston 213 has a spring motion independent of the motion produced by sliding the girth 200. To the inner end of each piston and insulated therefrom is secured a copper bar 218, to whose front surface is secured a metal contact-plate 218$^a$, formed with a notch 219 for the purpose of engaging a stay-wire as fed down by the carrier (see Figs. 5 and 6) and holding said stay-wire during the welding operation. The copper bar 218 and its contact-plate 218$^a$ constitute what I term a "movable" welding-jaw. 220 represents an adjustable screw mounted on the top of each movable welding-jaw. 224 represents a copper bar, which in the form shown is formed with two turns, constituting the secondary circuit of the transformer and designed to hold the primary coil 224ª of the primary circuit. There is a secondary coil 224 for each pair of welding-jaws, and each secondary coil 224 is formed with a terminal 224ᵇ at one end and 224ᶜ at its other end. 221 represents a copper bar connected at one end to the terminal 224ᵇ and provided at its front end with a metal contact-plate 222. Each contact-plate 222 is formed with a vertical groove 222ª to receive the strand-wire and is cored out horizontally, as at 223, to receive the face of the contact-plate 218ª and also the stay-wires. The contact-plate 222, together with its complemental bar 221, form a stationary welding-jaw, there being a stationary welding-jaw opposite each movable welding-jaw. 226 represents a copper bar the rear end of which is connected to a terminal 224ᶜ. 225 represents a loop composed of copper plates, one end of which is connected with the front end of the copper bar 226, the other end connected to the complemental bar 218. The loop 225 thus permits the moving of the movable welding-jaw in and out toward the stationary welding-jaw. It will of course be understood that the primary and secondary coils, as well as the parts connected therewith, including the bars 224, 221, 226, and 218, are not only insulated from the rest of the machine, but from each other in the usual way. The copper strips 225, formed in the U-shaped or other equivalent form, not only provide for the passage of the welding-current, but, as stated, also give the yielding connection necessary to the movable jaw. It will be seen that the secondary and welding circuit in each case is composed of a copper coil 224, to whose terminal are joined the bars 226 221, and that the movable jaw is connected to the bar 226 by means of a set of copper strips 225. Each welding-circuit is closed only during the welding operation, the current passing from one jaw to another through the wire or parts gripped between the jaws to be welded. The primary circuit is indicated in Figs. 6 and 37 by the symbol 266. 230 represents a girth extending the entire width of the machine connected to and operated simultaneously with the pitman 203. (See Figs. 7 and 8.)

Referring to Fig. 6, 223 represents a rod that extends the length of the machine and is supported in the ends of brackets 234 back of and over each rear or stationary welding-jaw. This rod is back of and nearly opposite the shaft 145. Mounted on said rod, opposite each bracket 234, is an arm 235, the arm 235 being free to swing on the rod 233. 237 represents a coiled spring arranged between a bracket 234 and its arm 235 and tending to throw the arm 235 away from its bracket 234. 238 represents a contact-block arranged on the bracket 234 and insulated therefrom. 239 represents a spring contact-block carried by the arm 235 and insulated therefrom, the block 239 being arranged to engage the contact-block 238, carried by the arm 234. 240 represents a series of bell-crank latches, one for each arm 235. The end 241 of the horizontal arm of each latch is adapted to catch over a lug 242 on the lower end of the arm 235. Each bell-crank is pivoted to the bracket 234 and has a vertical arm 246, which lies in the path of a screw 220 in a complemental movable welding-jaw. 247, Fig. 7, represents a series of coiled springs, one for each arm 246. Each spring 247 is arranged against a suitable support, bearing against the inner end of the arm 246 and serving to depress the arm 241 into engagement with the lug 242. As the rods 203 come forward they force forward the girth 230 and girth 200. The girth 200 engages the arms 235 and carries them forward until they are engaged and latched by their respective arms 241. The arms 235, with their blocks, constitute circuit-breaking devices, there being one of these circuit-breakers in the primary circuit 266 of each transformer. These circuit-breakers are arranged over the stationary welding-jaws the entire length of the machine and may be adjusted back and forth on the rod 223. These circuit-breakers and their complemental primary circuits are shown in Figs. 26 and 37.

Referring to Figs. 2, 11, 12, and 26, 260 represents a series of cams fast on the shaft 8, arranged in a staggered manner, there being one of these cams in the arrangement shown for each pair of welding-jaws. 261 represents a frame carried by a stationary girth immediately above the shaft 8. In this frame are a series of plungers 262, corresponding to the cams 260. Only seven cams 260 and seven plungers are shown. The number employed may be equal to the number of primary circuits or may be less in number and the primary circuits to each plunger in groups of two or more, as desired. I do not wish to be understood as limiting myself in this particular, as either arrangement can be used, depending on whether it is desired to have the successive welding made up of a succession of single welds or a succession of groups of welds. Each plunger is provided at its lower end with a roll 263 to be engaged by its complemental cam 260. 264 represents a series of coiled springs, each connected at one end to the frame 261 and at its other end to a pin 265, projecting from the upper end of its plunger 262 and normally tending to keep the plunger down to its lowest position, which is limited by the pin 265 engaging the frame 261. 266 represents one of the primary circuits running from a head-switch 266ª, located between the machine and the source of electrical power. A primary circuit 266 is connected to each contact 267 that is carried by an insulated spring 268 on the upper end of each plunger. (See Figs. 6, 11, 12, 26, 37.) 269 represents a series of stationary contacts complemental to the movable contacts 267. The primary circuit from each contact 269 runs through its complemental primary coil 224$^a$ to its complemental contact 238, thence to a "bus-bar" 266$^b$, and thence to the hand-switch. A wire runs from the hand-switch 266$^a$ to each block 235 of each pair of circuit-breakers $a$. The primary circuit is shown diagrammatically in Fig. 26. By this arrangement it will be seen that the primary circuit is adapted to be made and broken at two points—one at 269 by means of the cams 260 and second at 275 by means of the arm 235, the contact at 269 continuing until after the contact at 239 has been broken. While I have shown only one primary circuit connected to each contact 269, yet two or more primary circuits may be so connected. The primary circuits may be insulated from the machine in the usual way. While the stay-wire is being fed and cut the movable welding-jaw is carried to its front or open position. (See Fig. 6.) This motion releases the tension of the springs 214 and, further, latches the arm 235 by means of the girth 230. As the carriers 172 bring down the stay-wire the jaws 218 advance and grasp the stay-wire, each jaw 218 forcing the stay-wire 3 against the strand-wire 2 in a yielding manner by reason of its spring 214, each jaw acting independently. As the jaws are forced together the first cam 260 engages its complemental pin, (see Figs. 6, 11, 12, 26, 37,) thus closing the primary circuit at both points to the first welding-jaws. As the metal softens the spring 214 forces the movable jaw forward. The screw 220 is adjusted to engage the arm 246 of the bell-crank when the jaw is moved forward the desired distance to produce the amount of upset required. This engagement raises the arm 240 and breaks the circuit at 239, (see Fig. 26,) thus stopping the welding action at that jaw. The welding action of the succeeding jaws takes place in the manner above described in succession, one weld being completed before the other weld is made or one series of welds being completed before another series of welds is made, depending upon the arrangement of the cams, the primary circuits, &c. While in Fig. 26 but four sets of contacts are shown, it will be understood that there may be as many of these sets of contacts as there are primary circuits, or one or more primary circuits may be connected to each contact. After all of the cams 260 have acted the girth 200 is forced to the front of the machine, carrying the movable welding-jaws and carrying forward the girth 230 to reset the arms 235 for the next welding operation. 300 represents a girth running lengthwise of the machine just below the roller 34. (See Figs. 1, 5, 21, 22, and 23.) Upon the face of this girth over the casting 106, carrying the cutter 114, are secured two blocks 301, each formed with a groove 302 to receive a strand-wire 2 on each side of the plane occupied by the cutter 114 in order to receive the strand-wires 2, that lie on either side of the cut made by said knife; but one pair of these guide-plates is shown. It is to be understood, however, that there may be a pair of these guide-plates and their associated bending mechanism, hereinafter described, for each cutter 114, or, in other words, division-cutters that separate the blank into parts. After the weld has been completed the wheels 30 are operated to draw the welded material the required distance of another stay-wire, the strand-wires on either side of the cut running in the guideways 302. 303 represents a casting secured to the top of the rail 300 (see Fig. 25) over the plates 301. (See Fig. 22.) The guide-plates 301 may be secured to the rail 300 or they may be formed as a part of the casting 303, secured to the rail. (See Fig. 25.) Above the rail the casting 303 is formed with a narrow web 304. 305 represents two fingers pivoted one on either side of the web 304 upon a shaft 306, secured in the top of said web by a screw 307. These fingers at their forward end are formed with guide-grooves 308 for the wires 2, said grooves 308 being arranged just above and complemental to the grooves 302. (See Figs. 22 and 25.) 309 represent two coiled springs, one end of each of which is secured to a stud 310 on the end of each finger 305. From said finger each spring 309 extends rearward and is twisted around the shaft 306 and secured to a pin 311 at the end of said shaft. (See Fig. 23.) Each finger 305 has a rearwardly-extending lug 312 arranged normally to engage a pin 313, carried by the web 304 above said lug in order to limit the downward movement of the end of the finger 305, and thus maintain the end of the finger 305, with its slot 308, in proper alinement with the slot 302, but at the same time permit each finger 305 to go forward when the turned-in end of the strand-wire, hereinafter described, comes in contact with the finger during the feeding movement of the fabric. 314 represents a plate secured by set-screws 315 to the top of the front side of the web 303 between the two fingers 305. (See Fig. 24.) This plate is arranged a sufficient distance in front of the wires 3 to permit the latter to pass up between said plate and the front faces of the fingers 305. (See Figs. 23 and 24.) This plate from a point just above the plates 301 is bifurcated, (see Fig. 22,) one arm of the bifurcation extending down along the strand-wire 2 on one side of the cut and the other bifurcation extending down along the strand-wire 2 on the other side of the cut. (See Fig. 22.) This plate and its bifurcated arms serve to keep the strand-wires 2 in their grooves. 330 represents a bar or connecting-rod arranged to slide in suitable ways formed in blocks 331, secured to the upper side of the girth 300. (See Figs. 1 and 23.) 332 represents a bell-crank pivoted at its angle in a bracket 333, carried by the right-hand end of the framework. (See Fig. 1.) 334 represents a pitman connected at one end to the lower arm of the bell-crank 332 and at its other end to a crank 335 on the right-hand end of the shaft 8. (See Figs. 1 and 2.) 336 represents a link connecting the upper arm of the bell-crank 332 to the rod or bar 330. By this means the bar 330 is reciprocated at predetermined times. 340 (see Figs 21 and 34) represents a lever carrying at one end a finger 341. There are two of these levers, one being the complement of the other, (see Fig. 21,) and they are so arranged that the fingers 341 are close together and opposite each other and in such position that the cut ends of the stay-wire 3 are fed up and back of said fingers (see Figs. 21 and 22) at the end of each feeding operation.

Referring to Fig. 34, each lever 340 is formed with a hub 351 midway its ends and a hub 352 at the end of the lever opposite the finger 341. In Fig. 23, 344 represents a lever pivoted at its lower end by a pin 345 to a plate secured to the upper side of the girth 300. 346 represents a pitman pivoted at one end to the upper end of the lever 344 and at its other end, by means of a socket-piece 347, to the bar 330, Fig. 21. 343 represents a pintle arranged in the hub 351 of the lever 340 and in a complemental hub in the lever 344 midway the ends of the latter. 348 represents a link pivoted at one end by a pintle 356 to a plate carried by the top surface of the girth 300. 349 represents a pintle secured in the opposite end of the link 348 and arranged in the hub 352 at the end of the lever 340.

Referring to the left in Fig. 23, 355 represents a link pivoted at its lower end by a pintle 357 to a plate 358, secured to the top of the girth 300. 359 represents a pintle arranged to connect the opposite end of the link 355 with the hub 351 of the lever 340. 360 represents a lever pivoted midway its ends upon a stud 361, carried by the plate 358. (See Fig. 21.) 362 represents a pitman pivoted at one end to the rear end of the lever 360 and having its opposite end arranged in a sleeve 363, that is pivoted to the bar 330. 364 represents a pintle connecting the forward end of the lever 360 with the hub 352 of the lever 340. The fingers 341 of the two levers 340 are arranged opposite each other and work on opposite sides of the web 304, these fingers in their initial position standing between the forks of the plate 314 (see Figs. 21 and 22) in such manner that they are in front of the plane occupied by the strand-wires 2 and the stay-wires 3, so that the latter can pass up back of said fingers in the form of machine shown. The arrangement is such that the cut ends 365 come up back of the fingers 341 and remain there during a welding operation, at which time the bar 330 is operated, thus causing the described operation of the fingers 341 of the two levers 340, the one at the left moving backward, then to the left, then forward, the one at the right moving backward, then to the right and then forward, in order to bend the cut ends of their stay-wires 365 back upon themselves, as shown in Fig. 24, whereupon these fingers are given a reverse movement to their initial position. (Shown in Fig. 22.) 370 represents an eccentric-strap mounted upon an eccentric 371, that is keyed upon the shaft 8. (See Figs. 2 and 31.) This strap is formed with a screw-threaded socket 372. 373 represents a pitman, one end of which is arranged in the socket 372. The other end of the pitman is formed as a socket-piece 374. 375 represents a girth. (See Figs. 2, 5, and 31.) This girth extends from one end of the machine to the other and is arranged beneath and slightly in front of the roller 35$^a$, the rollers 35$^a$ and 36 being arranged to keep the strand-wires against the rear face of the girth 375. 376 represents a bar arranged to slide in a suitable way in the rear face of the girth 375. (See Figs. 2 and 5.) 377, Fig. 30, represents a casting secured to the rear face of the girth 375 by bolts 378, passing through holes 379 in the casting and taking into the girth. 380 represents a slide arranged to move in vertical suitable ways between the casting 377 and the rear face of the girth 375, Figs. 30 and 31. This slide 380 is formed with an inclined slot 381. 384 represents a roller secured by a pintle 385 to the bar 376 and arranged in the slot 381. 387 represents a lug on the lower end of the slide 380. 388 represents a pintle by which the lug 378 is pivoted to the socket-piece 374 of the pitman 373. By this arrangement the bar 376 and crimping-jaws, hereinafter described, carried thereby are reciprocated. 390 represents a series of stationary crimping-jaws which, as shown, are secured by screws 391 to the girth 375 in such way that these jaws are directly in front of the bar 376 and in addition to their function as crimping-jaws serve as retaining members for said bar. 392 represents a crimping-jaw secured by screws 393 to the sliding bar 376 and adapted as said bar is slid to grasp the stay-wire 3 between said jaw and a complemental stationary jaw 390 to form a crimp 394 in said stay-wire 3 in order to increase the efficiency and elasticity of the latter. The purpose of this crimp is well known and requires no special description. In the form of machine shown there is a pair of jaws 390 392 for each strand-wire. The number of crimpers and strand-wires to be engaged by them may be varied at pleasure. The parts are so timed that while the strand-wires are stationary during the welding operation the bar 376 is reciprocated to operate these crimping-jaws 392, the rollers 35$^a$ and 36 serving, as heretofore stated, to keep the strand-wires against the rear face of the girth in position to be engaged by their respective crimping-jaws.

Current being applied to the machine by means of the hand-switch 266$^a$, the operation of my improved machine is as follows: Referring to Figs. 1, 4, and 5, the strand-wires 2 are drawn into the machine between the rolls 33, past their complemental welding-jaws, back of the roll 34, and over their complemental wheels 30. The strand-wires then pass down in front of the rolls 35$^a$, back of the girth 375, in front of the first roll 36, Fig. 5, and under the succeeding rolls 36 to the take-up roll 16. This preferably is formed of two pieces to receive the ends of the strand-wires and the slack of the strand-wires taken up by turning the wheel 15 in the direction of the hands of a watch in Fig. 4. Instead of running the strand-wires 2 through the machine in the first instance as described they may be brought up past the welding-jaws and the strand-wires 2 welded to the stay-wire 3 and the fabric pulled along until its end can be connected to the rolls 16, after which the slack may be taken up by turning the wheel 22, as above described. The strand-wires 2 being in place, the machine is started, and the stay-wires 3 having been placed in the machine, as described, and the machine adjusted, as in Fig. 6, the stay-wire feed drives a length of the stay-wire into the receivers 82, the wire being immediately severed by the cutter 96, Fig. 17, and subdivided by the cutter 114, Fig. 20, whereupon it is seized by the transfer-fingers 178 and placed in front of the stationary welding-jaws. As this motion of the transfer-fingers is completed the stay-wire is grasped by the welding-jaws, said stay-wire, if desired, having been severed into two or more pieces (see Figs. 19 and 20) at the same time it is severed from the strip fed into the machine. The movements of the machine that slide the movable welding-jaws 218 to their front position cause the sliding bar 230 to set the latch 241 over each stationary welding-jaw. (See Fig. 6.) After each movable welding-jaw 218 has grasped the stay-wire 3 the circuit through each welding-jaw is closed in succession by means of the rods 262. (See Figs. 11, 12, and 26.) As the welding-current passes through the first welding-jaws the material softens, and by the action of the spring 214 said movable jaw is forced forward a predetermined amount, limited by the screw 220, which trips the bell-crank and breaks the circuit, stopping the welding action through the first set of welding-jaws. This welding action is momentary, and as soon as completed the next circuit is closed by the second pin 262 through the second set of welding-jaws, and so on, a series of welds being made rapidly in succession, but each weld being made independently of the other, so that an imperfect weld at one point has no influence at all upon the welds at other points. As the welding action is completed the movable jaws are thrown to the front, the strand-wires 2 are pulled over by hand and fastened to the wheels 30, which pull it up to the proper distance to place the stay-wires in position until enough stay-wires have been welded to the strand-wire, so that the stay-wires will be engaged by fingers 31 on the wheels 30. Thereafter as the welding-jaws open the wheels 30 are operated to pull into the machine sufficient length of strand-wires for another welding operation, the fabric as it is pulled over the wheels 30 being taken up by the take-up roll 16 in a well-known manner, the wheel 19 serving to keep a uniform tension on the roll 16 irrespective of the size of the roll. At each successive welding operation (when the stay-wire has been severed into lengths) the cut ends of the stay-wire are brought and left in front of the fingers 341, which fingers, as heretofore described, are operated during the welding operation to coil back the cut ends 365 of the stay-wires themselves. (See Fig. 33.) While these coiling and welding operations are in progress, the crimping-jaws 390 and 392 on the rear of the machine are operated to form the crimps, and a new length of stay-wire is being fed into the receivers 82, so that as the welding-jaws move back and the strand-wires are pulled up there is a new length of stay-wire being transferred from the receivers 82 to the welding-jaws for a subsequent welding operation. These steps, as described, continue as long as the machine is in operation, the stay-wires being welded to the strand-wires at predetermined intervals and each and all operations of the machine being automatic.

Referring to Figs. 6, 7, and 37, it will be seen that each of the contact-plates 222 and 218 is formed upon its rear side with a flat face that fits against the complemental face on the end of the copper bar to which the particular contact-plate is secured. These contact-plates, it will be further noticed, have beveled sides. The flat ends of the bars 218 and 221 terminate at the bottom in a lip 218$^b$ and 221$^b$, respectively. These lips have inclined upper edges complemental to the beveled contact-plates. This arrangement of the contact-plates is made movable and can be applied by sliding its beveled edge against the lips 221$^b$ or 218$^b$, respectively, thereby supporting the contact-plate at the bottom. Clamps 222$^a$ 218$^c$ are employed for engaging the top of the beveled edge of the contact-plates, and thus binding the plate to its respective bar. It will further be noted that both the receivers and the transfer-fingers are located out of the welding-plane. In the form shown these devices are above and in front of the welding-plane; but they might be located at any other position without departing from the spirit and scope of my invention. By the described arrangement, stay-wires can be fed into the receivers and thereafter transferred to the welding-jaws. The receivers and transfer devices being normally out of the welding-plane permits the welding of stay-wires to the strand-wires, as shown in the drawings, or to various forms of partially-completed wire fabric without interfering with the movement of the strand-wires or said partially-completed fabric, as would be the case if the receivers or transferrers were normally in the welding-plane. It will also be understood that the arrangement of cams shown in Fig. 2 may be variously modified to give any desired order in which the successive welds shall be made.

Having thus explained the nature of my invention and described a way of making and using the same, although without attempting to set forth all of the forms in which it may be made or all of the modes of its use, what I claim, and desire to secure by Letters Patent, is—

1. In combination with the coöperative elements of a wire-fabric machine, a series of stationary welding-jaws, a complemental series of yieldingly-mounted movable welding-jaws for welding strand and stay members, means for causing said jaws to grasp the parts to be welded, a series of primary circuit-closers, one for each pair or set of jaws, arranged to be operated in predetermined order, a series of primary circuit-breakers, one for each pair or set of jaws, arranged to be operated by the movable jaw of said pair or sets upon the softening of the metal to be welded.

2. In combination with the coöperative elements of a wire-fabric machine, means for feeding the strand-wire, means for feeding the stay-wire, means for subdividing the blank stay-wire, means for welding the stay-wire and strand-wire, and means for coiling the projecting end of the stay-wire.

3. In combination with the coöperative elements of a wire-fabric machine, a series of independent stay-wire receivers arranged out of the welding-plane, a cutter arranged to sever the stay-wire into blanks as it is fed into the receiver, and means for subdividing the severed blank.

4. In combination with the coöperative elements of a wire-fabric machine, means for feeding strand members, a series of welding-jaws for welding strand and stay members, a welding connection for each pair of welding-jaws comprising a transformer, a copper bar forming one terminal of the secondary circuit, the said bar serving as a stationary welding-jaw, a copper bar forming the other terminal of said secondary circuit, a complemental movable welding-jaw, a laminated copper connection comprising a series of copper strips between said movable jaw and its complemental copper bar.

5. In combination with the coöperative elements of a wire-fabric machine, means for feeding strand members, a series of welding-jaws for welding strand and stay members, a welding connection for each pair of welding-jaws comprising a copper bar constituting one terminal of the welding-circuit and formed with a contact-face terminating in a projecting ledge, a contact-plate arranged on said ledge, and means for maintaining said plate in contact with said face.

6. In combination with the coöperative elements of a wire-fabric machine, automatic means for forming welds, a stationary receiver for a stay-wire located outside of the welding-plane, and means for transferring a wire from said receiver to the welding means.

7. In combination with the coöperative elements of a wire-fabric machine, means for feeding a strand-wire, a series of welding members, a series of stay-wire receivers arranged outside of the welding-plane, and means for removing a stay-wire from said receivers and transferring it to the welding member.

8. In combination with the coöperative elements of a wire-fabric machine, a series of welding members, a series of stay-wire receivers positioned outside of the welding-plane and adapted to hold the stay-wires, a series of transferring devices also normally out of the welding-plane, and means to operate said devices to remove said wires from said receivers and transfer them to said welding members.

9. In combination with the coöperative elements of a wire-fabric machine, means for feeding strand members, means for welding strand and stay members comprising a series of pairs of welding-jaws, a series of transformers for said welding-jaws, a series of primary circuits for said transformers, and means for closing said primary circuits in succession and in a predetermined selective order.

10. In combination with the coöperative elements of a wire-fabric machine, a series of stationary stay-wire receivers, a series of welding-jaws, a series of transferring-fingers, a rod upon which said fingers are mounted, and means for giving said rod a combined movement of rotation and translation to remove a wire from said receivers and transfer it to said welding-jaws.

11. In combination with the coöperative elements of a wire-fabric machine, two wire-holders each formed with a wire-passage inclosed upon one side by a yielding detent, means for severing the wire between said holders, and means for transferring the wire from said holders.

12. In combination with the coöperative elements of a wire-fabric machine, a shaft, two oppositely-arranged complemental cams on said shaft, a block loosely mounted between said cams, a pitman-strap slidingly arranged upon said block, a roller at each end of said strap arranged to be engaged by said cams, whereby a reciprocating motion is given to said pitman-strap.

13. In combination with the coöperative elements of a wire-fabric machine, means for feeding strand members, a series of welding-jaws for welding strand and stay members, a secondary or welding circuit for each pair of jaws comprising a copper bar bent twice upon itself to form two coils, with an intervening space for reception of a primary coil, a copper bar provided with a welding-jaw connected to one terminal of said coiled bar, a copper bar connected to the other terminal of said coiled bar, a movable welding-jaw, and a laminated copper yielding connection between said last-mentioned bar and said movable welding-jaw.

14. In combination with the coöperative elements of a wire-fabric machine, means for receiving and holding a cross-wire, means for removing or liberating the cross-wire from the receiver or holder previous to welding, means for transferring or guiding said wire to the welding position, and means for welding.

15. In combination with the coöperative elements of a wire-fabric machine, means for welding crossed wires, means for holding a cross-wire crosswise of the longitudinal wires, but not in position for welding, means for transferring the cross-wire from the receiver to a position to be grasped by the welding-jaws.

16. In combination with the coöperative elements of a wire-fabric machine, independent stationary receivers or holders arranged to receive a cross-wire, combined with a wire-transferring mechanism arranged to remove said wire from said receivers and transfer it to the welding position.

17. In combination with the coöperative elements of a wire-fabric machine, a transfer device arranged normally out of the welding-plane, but adapted to carry a cross-wire into position for welding and to withdraw from the welding-plane as soon as said wire is clamped by the welding-dies, and means for operating said device.

18. In combination with the coöperative elements of a wire-fabric machine, a receiver arranged out of the welding-plane to receive and hold a cross-wire, means for removing said wire to the welding members, and means for welding said cross-wire to a plurality of strand-wires.

19. In combination with the coöperative elements of a wire-fabric machine, a stay-wire carrier operated to pass one side of a pair of coacting welding-jaws in placing the stay-wire in position for welding, and to withdraw entirely from the space between said coacting welding-jaws after the said stay-wire has been clamped in the welding-jaws, and while said welding is taking place.

20. In combination with the coöperative elements of a wire-fabric machine, a warp-wire, a holder for one or more cross-wires, means for liberating or removing said wire or wires from said holder one at a time, means for receiving and holding said liberated wire in a position to be grasped by coacting welding-jaws, and means for welding said warp and cross wires together at their intersections.

21. In combination with the coöperative elements of a wire-fabric machine, a holder for a cross-wire, welding-jaws operated to engage said wire to remove it from its holder and to weld the same to the strand-wires.

22. In combination with the coöperative elements of a wire-fabric machine, a guide for conveying a cross-wire into a position to be grasped by coacting welding-jaws, stops to receive and locate said wire, said stops being constructed to allow the cross-wire to pass on with the fabric after welding.

23. In combination with the coöperative elements of a wire-fabric machine, means out of the welding or strand-wire plane for supporting cross-wires, means for moving said cross-wires into a position across strand-wires to be grasped by coacting welding-electrodes.

24. In combination with the coöperative elements of a wire-fabric machine, a beam or rail, means for reciprocating said rail, plungers yieldingly mounted in said rail carrying movable welding-jaws and springs for coacting upon said plungers to effect the upsetting pressure when welding.

25. In combination with the coöperative elements of a wire-fabric machine, means for feeding strand members, means for welding strand and stay members comprising a pair of welding-jaws each provided with a contact welding-plate having a flat back or rear contact-face, beveled sides and a groove to receive the part to be welded.

26. In combination with the coöperative elements of a wire-fabric machine, an electrical welding device, a strand-wire feed, a stay-wire receiver arranged out of the plane of said welding device, a transferring device normally out of the plane of the welding device, and means for operating said transferring device to transport a stay-wire from said receiver to said welding device, and means for operating the welding devices to grasp the strand and stay wires and weld the same.

27. In combination with the coöperative elements of a wire-fabric machine, a wire-feed, a stationary knife, a movable thimble through which the wire is fed into the said machine alongside of said knife, and means for moving the thimble to draw the wire against the knife to sever said wire.

28. In combination with the coöperative elements of a wire-fabric machine, a stationary stay-wire receiver arranged out of the strand-plane, and independent means for transferring a stay-wire from the receiver to the strand-plane.

29. In combination with the coöperative elements of a wire-fabric machine, means for feeding strand-wires, means for feeding a stay-wire, means for welding said wires at points of intersection comprising a bar or head, means for reciprocating the same, a plunger yieldingly mounted in said head carrying a movable welding-jaw, and a spring coacting with said plunger to effect the upsetting pressure when welding.

30. In combination with the coöperative elements of a wire-fabric machine, means for feeding strand-wires, means for feeding a stay-wire, means for welding said wires at points of intersection, comprising a series of stay-wire receivers arranged out of the welding-plane and automatically-acting means for subdividing a blank held in said receivers.

31. In combination with the coöperative elements of a wire-fabric machine, means for feeding strand-wires, means for feeding a stay-wire, means for welding said wires at points of intersection, comprising means arranged to place a cross-wire in position to be grasped by the welding means and then to withdraw out of the strand-plane.

32. In combination with the coöperative elements of a wire-fabric machine, means for feeding strand-wires, means for feeding a stay-wire, means for welding said wires at points of intersection, comprising a cross-wire receiver, a cross-wire-transfer device arranged to place a wire in position to be grasped by the welding means, means for positioning the wire in the welding means arranged to permit the removal of the wire after the welding operation.

33. In combination with the coöperative elements of a wire-fabric machine, means for feeding strand-wires, means for feeding a stay-wire, means for welding said wires at points of intersection, comprising a stay-wire receiver arranged to permit the removal of a stay-wire therefrom, a transfer device arranged to remove a wire from said receiver and place it in a position to be grasped by the welding means and having provision to permit the releasing of said wire after it is engaged by said welding means.

34. In combination with the coöperative elements of a wire-fabric machine, means for feeding strand-wires, means for feeding a stay-wire, means for welding said wires at points of intersection, comprising a stay-wire receiver, a transfer device, comprising two wire-engaging members, one of which is movable and arranged as a finder or means for guiding the stay-wire between said members.

35. In combination with the coöperative elements of a wire-fabric machine, means for feeding strand-wires, means for feeding a stay-wire, means for positioning and welding said strand and stay wires at points of intersection, a fabric-drum, and means including an adjustable belt-tightener for driving said drum to take up the fabric.

36. In combination with the coöperative elements of a wire-fabric machine, an intermittently-operated stay-wire feed, comprising means for gripping and feeding the wire and mechanism for driving said means including a continuously-driven but intermittently-deflected pawl.

37. In combination with the coöperative elements of a wire-fabric machine, a stay-receiver, comprising a member formed with a segmental groove terminating in a wire-receiving slot and a spring-pressed finger formed with a complemental segment adapted to fit into said groove and yieldingly retain the stay-wire in said slot but to permit the removal of the wire therefrom.

38. In combination with the coöperative elements of a wire-fabric machine, means for feeding strand-wires, means for feeding a stay-wire, means for welding said wires at points of intersection, a stay-wire cutter comprising a stationary knife, a sliding thimble or member, and means for moving said member to draw the wire against the knife to sever the wire.

39. In combination with the coöperative elements of a wire-fabric machine, means for feeding strand-wires, means for feeding a stay-wire, means for receiving and holding a stay-wire, means for subdividing said wire after it is fed into the receivers, and means for welding said wires at points of intersection.

40. In combination with the coöperative elements of a wire-fabric machine, means for feeding strand-wires, means for feeding a stay-wire, means for receiving the stay-wire, means for subdividing said wire, and means for welding said wires at points of intersection.

41. In combination with the coöperative elements of a wire-fabric machine, means for feeding strand-wires, means for feeding a stay-wire, means for welding said wires at points of intersection, a stay-wire coiler, comprising a stationary pin or anvil and a reciprocating bending-pin adapted to bend the end of a stay-wire about said anvil and means for operating said pin.

42. In combination with the coöperative elements of a wire-fabric machine, means for feeding strand-wires, means for feeding a stay-wire, means for positioning and welding said wires at points of contact, and means for controlling the welding action, comprising a transformer for each pair of welding-jaws, a circuit-closer for the primary circuit of each transformer, and means for selectively operating said closers.

43. In combination with the coöperative elements of a wire-fabric machine, means for feeding strand-wires, means for feeding a stay-wire, means for positioning and welding said wires at points of intersection, said welding means including a plurality of pairs of welding-jaws and a transformer for each pair of welding-jaws, a break-switch in the primary circuit of each transformer, a movable girth arranged to close said switches as a gang, and means carried by one member of each pair of welding-jaws for independently opening its individual switch.

44. In combination with the coöperative elements of a wire-fabric machine, means for feeding strand-wires, means for feeding a stay-wire, means for positioning and welding said wires at points of intersection comprising a gang of rear stationary welding-jaws, a series of independent movable complemental front welding-jaws, means for moving the front jaws as a gang to grasp the wires, and provision whereby each front jaw moves independently to upset the weld.

45. In combination with the coöperative elements of a wire-fabric machine, means for feeding the strand-wires, means for feeding a stay-wire, means for positioning and welding said wires at points of intersection, comprising a gang of stationary welding-jaws or electrodes, a movable girth, a complemental series of independent welding-jaws yieldingly mounted in said girth, means for operating said girth to advance the movable jaws to permit the wires to be grasped between each front and rear welding-jaw, with provisions whereby each movable welding-jaw moves independently to upset the weld.

46. In combination with the coöperative elements of a wire-fabric machine, means for feeding strand-wires, means for feeding a stay-wire, means for welding said wires at points of intersection to form a fabric, said stay-wire-feeding means comprising a device to place a stay-wire in position to be grasped by the welding means and then withdraw out of the strand-plane.

47. In combination with the coöperative elements of a machine for making wire fabric, means for feeding strand-wires, means for feeding a stay-wire, means for welding said wires at points of intersection to form a fabric, said stay-wire-feeding means comprising a receiver and an independent transfer device arranged to remove the wire from said receiver and place it in position to be received by the welding means.

48. In combination with the coöperative elements of a machine for making wire fabric, means for feeding strand-wires, means for feeding a stay-wire, means for welding said wires at points of intersection to form a fabric, said stay-wire-feeding means comprising a receiver arranged to permit the removal of a stay-wire therefrom, an independent transfer device arranged to remove a wire from said receiver and position it to be grasped by the welding means, and having provision to permit the release of said wire after it is engaged by said welding means.

49. In combination with the coöperative elements of a machine for making wire fabric, means for feeding strand-wires, means for feeding a stay-wire, means for welding said wires at points of intersection to form a fabric, said stay-wire-feeding means comprising a receiver and an independent transfer device, said device being composed of two wire-engaging members, one of which is movable and arranged as a finder or means of guiding the stay-wire between said members.

50. In combination with the coöperative elements of a wire-fabric machine, a transfer device, comprising two members, one of which is movable with relation to the other and having a part for locating the stay-wire and guiding it in position to be grasped by said transfer member.

51. In combination with the coöperative elements of a wire-fabric machine, automatic welding means, means for feeding strand-wires, means for feeding a stay-wire, comprising two members, one of which is movable with relation to the other and formed with an extension or part for locating the stay-wire and guiding it in position to be grasped by said members, and a spring arranged to yieldingly maintain the movable member against its complemental member except when opened by resistance offered through the stay-wire.

52. In combination with the coöperative elements of a wire-fabric machine, a dovetailed rail, a series of arms adapted to rest on said rail, each formed with a lip to engage the under side of the rail, and clamps arranged to engage said arms on the opposite side of said rail whereby said arms may be secured in any desired position of adjustment.

53. In combination with the coöperative elements of a wire-fabric machine, a series of movable electrodes, a complemental series of break-switches, a movable rail or girth arranged to set or close said switches, and means whereby each electrode automatically breaks or opens the switch of its circuit.

54. In combination with the coöperative elements of a wire-fabric machine, means for feeding strand members, means for feeding a stay member, means for welding said members at points of intersection, comprising a pair of welding-jaws, a transformer, a copper bar connecting each jaw to a terminal of the secondary circuit of the transformer, said copper bars being secured together but insulated from each other.

55. In combination with the coöperative elements of a wire-fabric machine, means for feeding strand members, means for feeding a stay member, means for welding said members at points of intersection, comprising a series of pairs of welding-jaws, a transformer for each pair of welding-jaws, a series of primary circuit-closers, means for operating said closers selectively in advance of the welding operation, a break-switch for each pair of welding-jaws, and means controlled by the amount of upset for automatically opening each break-switch individually.

56. In combination with the coöperative elements of a wire-fabric machine, means for feeding strand members, means for feeding a stay member, means for welding said members at points of intersection, comprising a plurality of pairs of welding-jaws, a transformer for each pair of welding-jaws, a copper bar forming each terminal of the secondary circuit of each transformer, one welding-jaw of each pair being connected to one end of one of said bars, and a laminated copper connection between the complemental jaw and one end of the complemental bar.

57. In combination with the coöperative elements of a wire-fabric machine, means for feeding strand members, means for feeding a stay member, means for welding said members at points of intersection, comprising a plurality of pairs of welding-jaws each connected to a stationary copper bar, a transformer for each pair of welding-jaws, the secondary circuit of the transformer being composed of a copper bar formed in two coils with a space between the coils, one end of the coil being connected to one of the stationary bars and the other end of the coil to the other end of the other stationary bar, the primary circuit of the transformer being composed of a wire coil arranged in the space between the loops or turns of the secondary circuit.

58. In combination with the coöperative elements of a wire-fabric machine, means for feeding strand members, means for feeding a stay member, means for welding said members at points of intersection, comprising a series of pairs of welding-jaws, a transformer for each pair of welding-jaws, a primary circuit open at two points for each transformer, a series of closers, a series of break-switches, means for selectively operating the closer of each primary circuit in advance of the welding action and maintaining the circuit closed at this point during the welding action, means for closing the break-switches in advance of the welding action, and means whereby the opening of each break-switch is controlled by the amount of upset of the weld.

59. In combination with the coöperative elements of a wire-fabric machine, means for feeding strand-wires, means for feeding a stay-wire, means for welding said wires at points of intersection, comprising a plurality of stationary welding-jaws, a plurality of complemental movable welding-jaws, means for moving the movable jaws as a gang to grasp the work, and means whereby each movable jaw has an independent upsetting movement.

60. In combination with the coöperative elements of a wire-fabric machine, means for feeding strand members, means for feeding a stay member, means for welding said members at points of intersection, comprising a series of welding units, a source of power, means for selectively and independently connecting each welding unit with the source of power, an independent power-disconnecting device for each unit, and means controlled by each unit for automatically operating its power-disconnecting device upon the completion of the welding operation of that unit.

In testimony whereof I have affixed my signature in presence of two witnesses.

JOHN C. PERRY.

Witnesses:
H. L. ROBBINS,
R. BULLOCK.